US012632660B1

(12) United States Patent
    Rongali et al.

(10) Patent No.: US 12,632,660 B1
(45) Date of Patent: May 19, 2026

(54) LANGUAGE MODEL PROCESSING

(71) Applicant: Amazon Technologies, Inc., Seattle, WA (US)

(72) Inventors: Subendhu Rongali, New York, NY (US); Chandana Satya Prakash, Mountain View, CA (US); Arpit Gupta, Emeryville, CA (US); Wael Hamza, Wylie, TX (US)

(73) Assignee: Amazon Technologies, Inc., Seattle, WA (US)

( * ) Notice: Subject to any disclaimer, the term of this patent is extended or adjusted under 35 U.S.C. 154(b) by 180 days.

(21) Appl. No.: 18/541,765

(22) Filed: Dec. 15, 2023

(51) Int. Cl.
    *G06F 40/289*     (2020.01)
    *G06F 40/284*     (2020.01)
    *G06F 40/295*     (2020.01)
    *G06F 40/20*     (2020.01)

(52) U.S. Cl.
    CPC .......... *G06F 40/289* (2020.01); *G06F 40/284* (2020.01); *G06F 40/295* (2020.01); *G06F 40/20* (2020.01)

(58) Field of Classification Search
    CPC .... G06F 40/284; G06F 40/289; G06F 40/216; G06F 40/20; G06F 40/295; G06F 40/279; G06F 40/16; G06F 16/3344; G06F 16/3329; G06F 40/40; G10L 15/02; G10L 15/04; G10L 15/16; G10L 2025/783; G10L 25/30; G10L 15/063; G10L 15/22; G10L 25/78
    See application file for complete search history.

(56) References Cited

U.S. PATENT DOCUMENTS

| | | | |
|---|---|---|---|
| 2011/0307435 A1* | 12/2011 | Overell | G06F 16/367 |
| | | | 706/46 |
| 2021/0019309 A1* | 1/2021 | Yadav | G06F 16/2428 |
| 2022/0121884 A1* | 4/2022 | Zadeh | G06N 3/006 |
| 2022/0335947 A1* | 10/2022 | Li | G10L 15/26 |
| 2023/0059494 A1* | 2/2023 | Hunter | G06F 40/137 |
| 2023/0342552 A1* | 10/2023 | Bhardwaj | G06N 3/045 |
| 2023/0386473 A1* | 11/2023 | Li | G10L 25/30 |
| 2024/0126794 A1* | 4/2024 | Cook | H04L 51/02 |
| 2024/0362421 A1* | 10/2024 | Markov | G06F 40/216 |
| 2024/0419906 A1* | 12/2024 | Laprise | G06F 40/30 |

(Continued)

OTHER PUBLICATIONS

Brown, et al., "Language models are few-shot learners", Advances in Neural Information Processing Systems, 33:1877-1901, 2020.

(Continued)

*Primary Examiner* — Vijay B Chawan
(74) *Attorney, Agent, or Firm* — Pierce Atwood LLP

(57) ABSTRACT

Techniques for constraining a language model's generation/decoding process using a finite state machine are described. A finite state machine may represent information corresponding to APIs, arguments and argument values that are available/supported by the system. In some embodiments, a language model (LM) is constrained to generate tokens representing valid API calls based on the finite state machine. The system may enable generation of argument values from a defined set or free-form generation of argument values. The system may also enable unconstrained generation of a response by the LM. In some embodiments, a trie data structure is used to determine the possible next tokens that the LM can generate from.

24 Claims, 12 Drawing Sheets

(56)      References Cited

U.S. PATENT DOCUMENTS

2024/0420418 A1*  12/2024  Wu .......................... G06F 40/30
2025/0130780 A1*   4/2025  Chandramohan ..... G06F 40/284

OTHER PUBLICATIONS

Budzianowski, et al., "Multiwoz—a large scale multi-domain wizard of oz dataset for task-oriented dialogue modeling", arXiv preprint arXiv:1810.00278, 2018.
Coucke, et al., "Snips voice platform: an embedded spoken language understanding system for private-by-design voice interfaces", arXiv preprint arXiv:1805.10190, 2018.
De Cao, et al., "Autoregressive entity retrieval", arXiv preprint arXiv:2010.00904, 2020.
Liang, et al., "Taskmatrix.AI: Completing tasks by connecting foundation models with millions of APIs", arXiv preprint arXiv:2303.16434, 2023.
Ouyang, et al., "Training language models to follow instructions with human feedback", Advances in Neural Information Processing Systems, 35:27730-27744, 2022.
Patil, et al., "Gorilla: Large language model connected with massive APIs", arXiv preprint arXiv:2305.15334, 2023.
Qin, et al., "ToolLLM: Facilitating large language models to master 16000+ real-world APIs", arXiv preprint arXiv:2307.16789, 2023.
Rastogi, et al., "Towards scalable multi-domain conversational agents: The schema-guided dialogue dataset", Proceedings of the AAAI Conference on Artificial Intelligence, vol. 34, pp. 8689-8696, 2020.
Rongali, et al., "Training naturalized semantic parsers with very little data", arXiv preprint arXiv:2204.14243, 2022.
Schick, et al., "Toolformer: Language models can teach themselves to use tools". arXiv preprint arXiv:2302.04761, 2023.
Shen, et al., "HuggingGPT: Solving AI tasks with ChatGPT and its friends in Hugging Face", arXiv preprint arXiv:2303.17580, 2023.
Shin, et al., "Constrained language models yield few-shot semantic parsers", arXiv preprint arXiv:2104.08768, 2021.
Wu, et al., "Transferable multi-domain state generator for task-oriented dialogue systems", arXiv preprint arXiv:1905.08743, 2019.
Wu, et al., "From paraphrasing to semantic parsing: Unsupervised semantic parsing via synchronous semantic decoding", arXiv preprint arXiv:2106.06228, 2021.
Zhang, et al., "Find or classify? Dual strategy for slot-value prediction on multi-domain dialog state tracking", arXiv preprint arXiv:1910.03544, 2019.
Zhang, et al., "BERTscore: Evaluating text generation with BERT", 2020, arXiv:1904.09675.
Zheng, et al., "Judging LLM-as-a-judge with MT-Bench and ChatBot arena", arXiv preprint arXiv:2306.05685 (2023).

\* cited by examiner

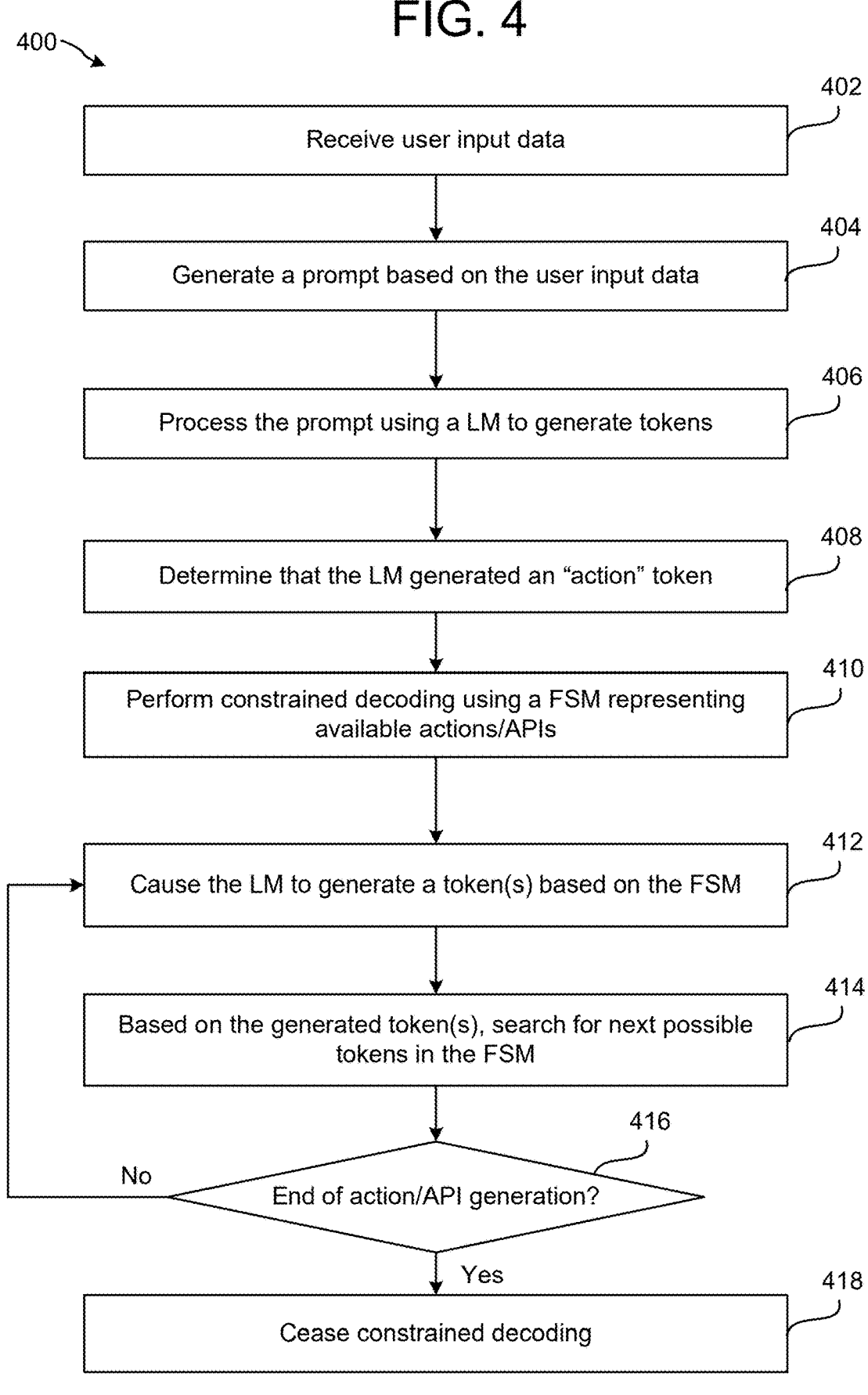

402 Receive user input data

404 Generate a prompt based on the user input data

406 Process the prompt using a LM to generate tokens

408 Determine that the LM generated an "action" token

410 Perform constrained decoding using a FSM representing available actions/APIs 412 Cause the LM to generate a token(s) based on the FSM 414 Based on the generated token(s), search for next possible tokens in the FSM 416 End of action/API generation?

No

Yes

418 Cease constrained decoding

FIG. 8

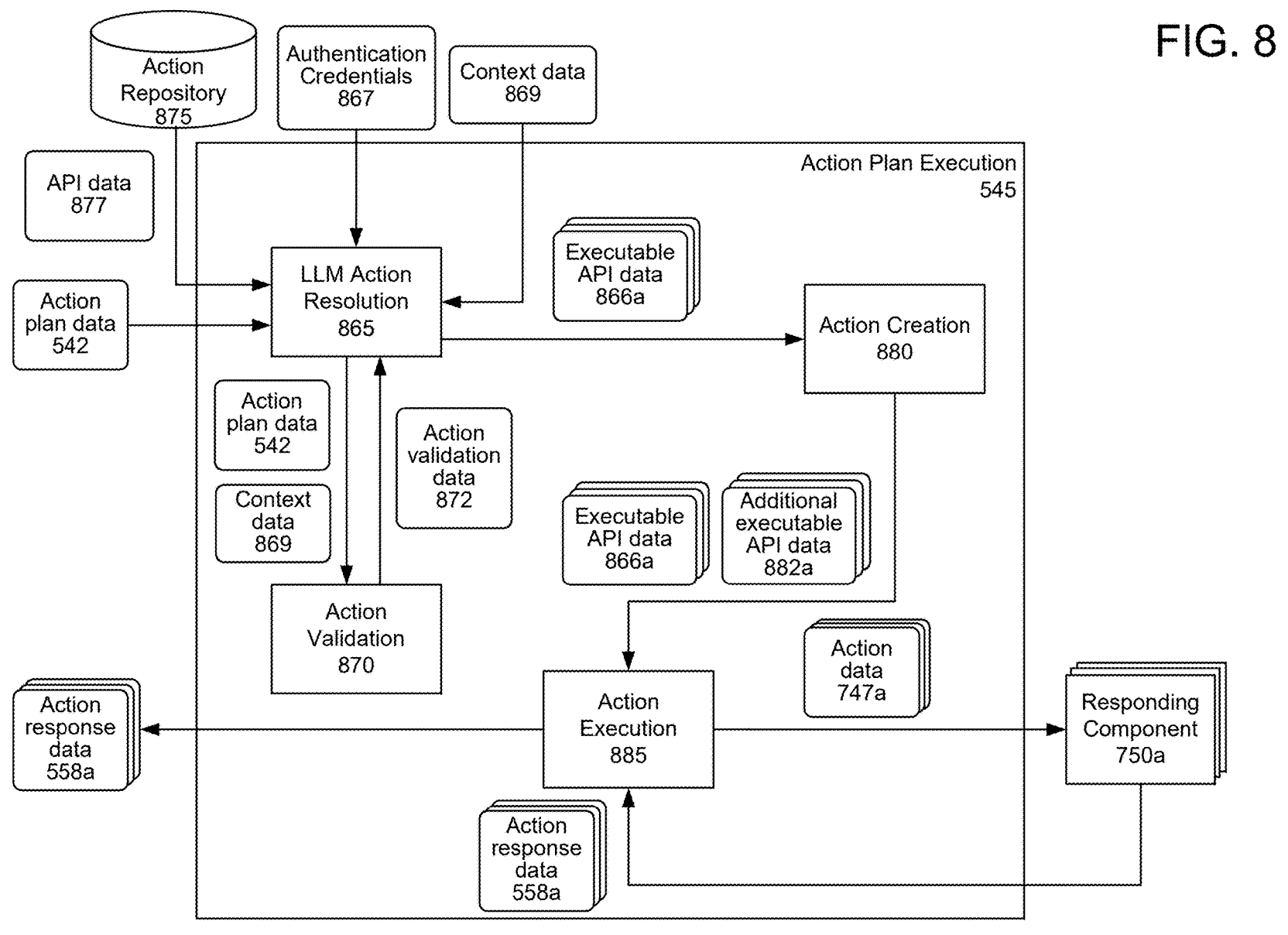

Action Plan Execution 545

Action Creation 880

Responding Component 750a

Additional executable API data 882a

Action data 747a

Executable API data 866a

Executable API data 866a

Action Execution 885

Action response data 558a

Context data 869

Authentication Credentials 867

Action validation data 872

LLM Action Resolution 865

Action plan data 542

Context data 869

Action Validation 870

Action Repository 875

API data 877

Action plan data 542

Action response data 558a

Figure 11:
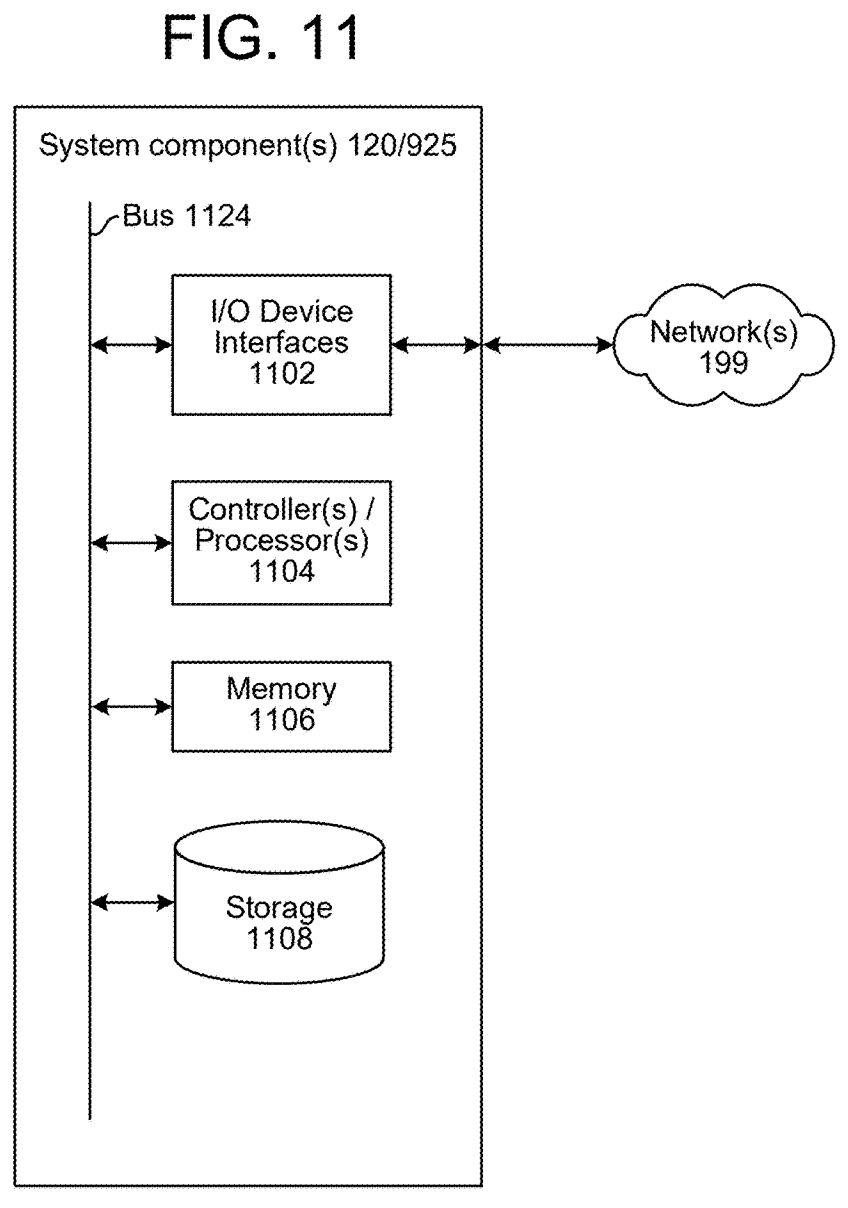

System component(s) 120/925

Bus 1124

Network(s) 199

I/O Device Interfaces 1102

Controller(s) / Processor(s) 1104

Memory 1106

Storage 1108

LANGUAGE MODEL PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

Natural language processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram of a user input processing component for a language model (LM) to process using constrained decoding and a finite state machine, in accordance with some embodiments.

FIG. 4 is a flow chart illustrating a process that may be performed by the user input processing component, in accordance with some embodiments of the present disclosure.

FIG. 8 is a conceptual diagram illustrating example components and processing of an action plan execution component, according to embodiments of the present disclosure.

FIG. 10 is a block diagram conceptually illustrating example components of a device, according to embodiments of the present disclosure.

FIG. 11 is a block diagram conceptually illustrating example components of a system, according to embodiments of the present disclosure.

DETAILED DESCRIPTION

Figure 2:
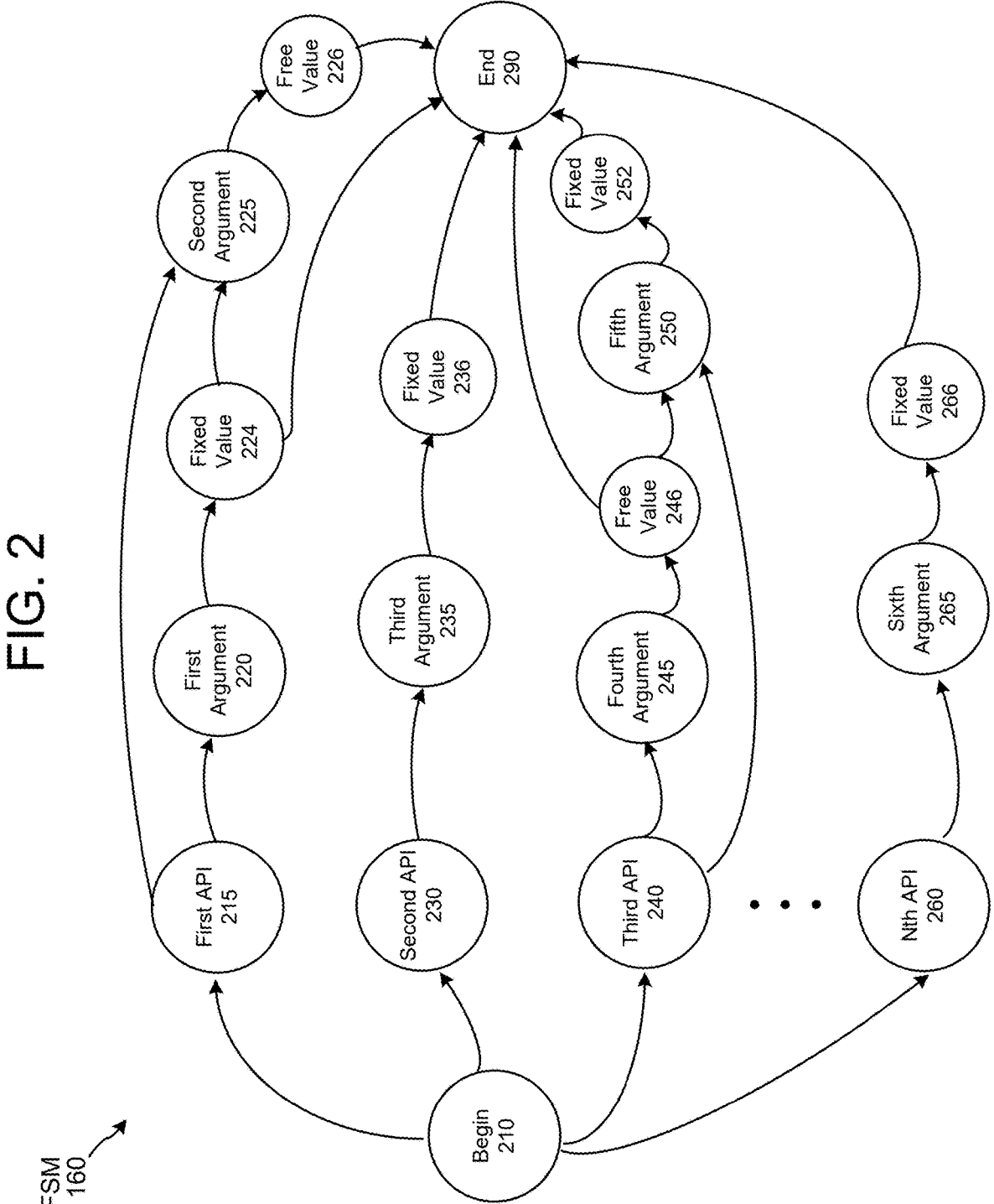
FIG. 2 is a conceptual diagram illustrating a finite state machine representing available actions for the LM to select from, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech.

Language modeling is the use of various statistical and probabilistic techniques to determine the probability of a given sequence of words occurring in a sentence. A language model (LM) can be used to perform various tasks including generative tasks that involve generating data rather than discriminating between given classes. Language models analyze bodies of text data to provide a basis for their word predictions. The language models are generative models. In some embodiments, the language model may be a large language model (LLM). An LLM is an advanced artificial intelligence system designed to process, understand, and generate human-like text based on relatively large amounts of data. An LLM model may be built using deep learning techniques, such as neural networks, and may be trained on extensive datasets that include text (or other type of data) from a broad range of sources, such as old/permitted books and websites, for natural language processing. An LLM uses an expansive training dataset, as compared to a relatively smaller language model, and can include a relatively large number of parameters (in the range of billions, trillions, or more), hence, they are called "large" language models. An example of a LM is Alexa generative models.

An artificial intelligence (AI) assistant system may use one or more of ASR, NLU, NLG, TTS, and LM processing to process inputs, such as user inputs, event alerts, etc., and generate outputs.

Certain AI assistant systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input.

In some embodiments, the system may be configured to process the ASR data (or other type of data representing another type of user input) using one or more LMs to determine the action responsive to the user input. For example, in response to the user input "Please plan a 4-person trip to [Location] from [Date 1] to [Date 2]," the system may determine that the user wants to book a trip to [Location] during the specified dates. Thereafter, the system may use the language model(s) to generate one or more tasks associated with booking the trip (e.g., (1) find a flight ticket from the user's location to [Location] leaving on [Date 1] and returning on [Date 2]; and (2) find a hotel in [Location] between [Date 1] and [Date 2]) and select a task of the one or more tasks to be performed first (e.g., (1) find a flight ticket leaving the user's location on [Date 1] and returning on [Date 2].) The system may determine one or more components (e.g., a skill component, a LLM agent component, etc.) configured to perform action(s) associated with a task.

The LM(s) may generate an output indicating one or more application programming interface (API) calls requesting that the one or more components return a description of the action(s) they are configured to/will perform with respect to the user input and/or current task. As used herein, an "API call" is a directive or other type of request for the corresponding API to perform a particular action (e.g., an API call of turn_on_device (device="indoor light 1") corresponds to a directive/request to an API to turn on a device associated with the identifier "indoor light 1"). The system may execute the API calls and the LM(s) may determine that a first component (e.g., a travel booking website) of the one or more components is configured to perform an action responsive to the user input/task. The system may then perform as discussed herein above with respect to a next task (e.g., find a hotel in [Location] between [Date 1] and [Date 2]) of the one or more tasks. Thereafter, the LM(s) may determine that one or more components have been selected to perform the action(s) responsive to the user input, generate a system response informing the user of the actions to be performed, and, with authorization, cause the one or more components to perform the action(s).

LMs, in particular large language models, have the ability to allow computing systems to converse with users and solve a wide range of tasks. They have also been extended to make use of external tools or services through API calls. In some cases, integration of external tools or services can be achieved by fine-tuning the model or with the use of in-context learning, where commands and descriptions of the external APIs, along with examples of how to call them, may be given to the LM via a prompt input. The prompt, in some cases, may be limited in size (e.g., there may be a maximum number of tokens that can be included in prompt). In other cases, long prompts (i.e., prompts with a lot of information) may result in inaccurate or undesirable responses from the LM. Therefore, the number of examples and potential APIs included in the prompt may be small and may not represent all available actions. Additionally, a LM may generate an API call that may appear to be accurate but is not supported by any external tools or services; the LM may generate such an API call due to hallucination. Model hallucination (where a model generates output data that includes incorrect information) is an issue with generative models like language models, LMs, etc. Despite fine-tuning and grounding with examples, models have been known to generate incorrect but seemingly logically plausible facts and completions. In the case of API calls, this can result in a model making up API calls with arguments that appear plausible yet do not match any instances from the actual API catalog. Such made up API calls can result in a variety of errors.

The present disclosure describes techniques for guiding a language model to generate accurate actions and API calls that are supported by a system. The techniques involve grounding the generation process of the language model to an available set of actions and APIs. Some embodiments involve using a finite state machine (FSM), representing the available set of actions and APIs, to constrain the decoding algorithm of the language model. Such techniques allow the language model to hallucinate actions and APIs that are supported by the system. Also, the language model can be grounded to a large set of actions and APIs, rather than being limited by a prompt size.

The FSM may consist of various states in the process of API generation, where a full trace in the FSM from the start state to finish state may represent a valid API call. The language model can be used to effectively reason over state transitions and generate a trace from the FSM that corresponds to a valid API call.

Some embodiments also allow the language model to seamlessly switch between action generation and system response generation stages, where the constrained decoding is applied to the action generation stage and not applied to the response generation stage.

In addition to the name, arguments, and structure, another aspect of an API call is the actual argument values. An argument value can be a fixed value (e.g., the value for the argument "volumeLevel" in a device control API may be a number range), or can be "free" text (e.g., the value for the argument "location" in a weather API may be any location). Some embodiments constrain the language model to generate an argument value that matches one of the fixed values acceptable for the argument. Some embodiments allow the language model to generate unconstraint argument values when free text values are acceptable for the argument.

Techniques of the present disclosure provide, among other things, improvements in using language models to reason and generate actions to be performed to respond to a user request. Using the techniques described herein, the language models can generate actions with improved accuracy. Furthermore, prompt space can be available now to include other information than available actions/APIs, since that information is provided via the FSM. Moreover, the techniques described herein can be used without additional fine-tuning of the language model.

Examples of systems that augment language model processing with action determination include ChatGPT Plugins, Bard Extensions, Amazon Alexa voice assistant, and others.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1:
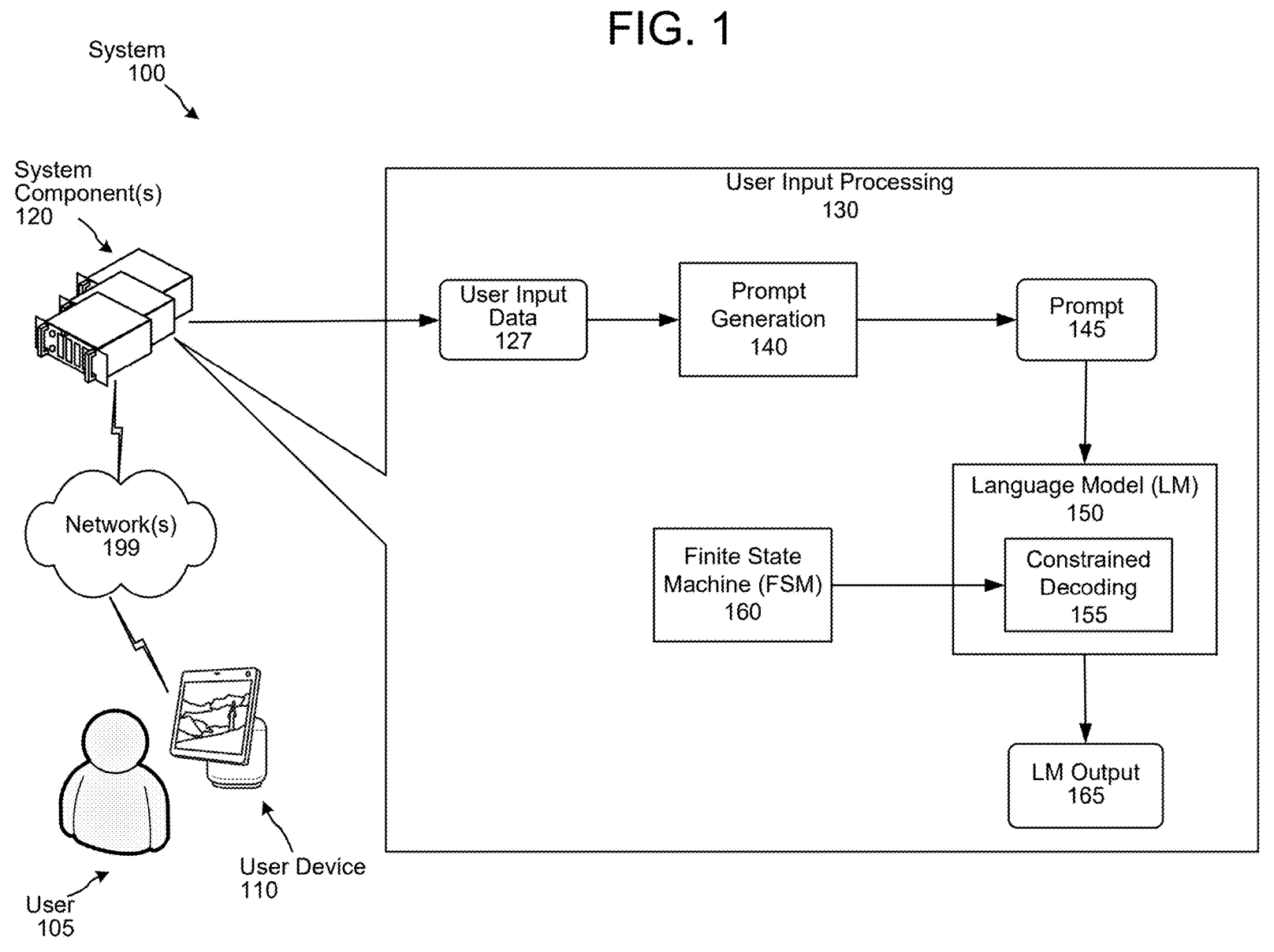

FIG. 1 is a conceptual diagram of a system 100 including a user input processing component 130 for a language model (LM) 150 to process using constrained decoding and a finite state machine (FSM) 160, in accordance with some embodiments. As shown in FIG. 1, the system 100 may include a user device 110, local to a user 105, and a system component(s) 120 connected, to the user device 110, across one or more networks 199. The network(s) 199 may include the Internet and/or any other wide or local area network, and may include wired, wireless, and/or cellular network hardware. Although the figures and discussion of the present disclosure illustrate certain components and steps in a particular order, the components may be implemented in a different manner (as well as certain components removed or added) and the steps described may be performed in a different order (as well as certain steps removed or added) without departing from the present disclosure.

The system component(s) 120 may include one or more processing components configured to process user inputs and other type of inputs (e.g., sensor data, audio data, data indicative of an event occurring, etc.) received via the user device 110. In example embodiments, the system component(s) 120 may process spoken inputs using ASR processing. The system component(s) 120 may also be configured to process non-spoken inputs, such as gestures, textual inputs, selection of GUI elements, selection of device buttons, etc. The system component(s) 120 may also include other components to understand an input, determine an action to be performed in response to receiving the input, generate an output responsive to the input, and the like. Such other components may perform NLU processing, TTS processing, other components to facilitate user input processing, some of which are described below in relation to FIG. 9.

In some embodiments, the system component(s) 120 may include the user input processing component 130. The user input processing component 130 may be configured to use a language model (LM) 165 and a finite state machine (FSM) 160 to process with respect to a user input. The user input processing component 130 may also include a prompt generation component 140.

In some cases, the user 105 may speak an input, and the user device 110 may capture audio representing the utterance. The user device 110 may send audio data to the system component(s) 120 for processing and/or may process the audio data using the user device 110. Using ASR processing, the audio data may be processed to determine a transcription of the spoken input (e.g., ASR data including text/token data).

In other cases, the user 105 may enter an input via a touchscreen display of the user device 110, a keyboard and/or mouse of the user device 110, or the like. The entered input may be a natural language input, may be a selection of a GUI element, etc. In yet other cases, the user 105 may provide a gesture input, which may be captured by a camera of the user device 110.

In any case, the user input may be processed to determine user input data 127. In the case of a spoken or typed natural language input, the user input data 127 may be text or token data representing the natural language input. For example, the user input data 127 may be "Show me today's weather" or "Turn on the lights and set the thermostat to [temperature]." In case of the other types of input, the user input data 127 may be text or token data indicative of the user input. For example, for a gesture input of nodding head, the user input data 127 may be "head nod" or "yes". As another example, for a selection of a GUI element corresponding to a movie title, the user input data 127 may be "selection of [movie title]" or "user selected [movie title] for playback."

The user input processing component 130 may receive the user input data 127 from the system component(s) 120 (or in other embodiments from the user device 110). The prompt generation component 140 may process the user input data

127 and may generate a prompt 145 based on the user input data 127. The prompt 145 may be an input/request to the LM 150 to generate data for responding to the user input represented in the prompt 145. In some embodiments, the prompt 145 may include the user input data 127 and context data corresponding to the user input. The context data may be user context, device context, environmental context, etc. The prompt 145 may include other information as described below in relation to FIGS. 5-7.

In some embodiments, the prompt generation component 140 may generate the prompt 145 based on an input/request received from a system component 120, where the system component 120 may request data to be generated by the LM 150. In such cases, the prompt 145 may be an input requesting the LM 150 to determine data based on a natural language request, where the natural language request may be provided by the system component 120.

The prompt 145 may be processed by the LM 150. Based on processing the prompt 145, the LM 150 may generate data (e.g., tokens, text, etc.) representing various information, such as an action (e.g., an API call) to be performed to respond to the user input and/or a system response to be presented based on the user input. Although the description states that the LM 150 generates an "action" or a "system response", it should be understood that the LM 150 generates data (e.g., tokens, text, etc.) representing an action and generates data (e.g., tokens, text, etc.) representing a system response. The data representing the action can then be used to perform the action (e.g., execute the API call). The data representing the system response can be used to present the system response (e.g., display text, graphics, etc. corresponding to the system response, output synthesized speech corresponding to the system response, etc.).

In some embodiments, the LM 150 may include a constrained decoding component 155 (or may be in communication with the constrained decoding component 155). The constrained decoding component 155 may implement a decoding technique (e.g., software code, algorithm, etc.) that may be used to cause the LM 150 to generate text/tokens in a particular manner. In some embodiments, the constrained decoding component 155 may constrain the LM's decoding process in view of the FSM 160. In other words, the constrained decoding component 155 may cause the LM 150 to generate tokens based on an allowed sequence of tokens represented in the FSM 160. The LM 150 may generate the data representing an action in a sequential manner, for example, on a token(s)-by-token(s) basis and the constrained decoding component 155 may determine allowable/possible next tokens, from the FSM 160, based on the generated/prior tokens.

To integrate the FSM 160 with the LM 150, the constrained decoding component 155 may utilize a trie data structure (which may be an efficient hash map). Given a certain prefix of tokens, the trie data structure provides the LM 150 a list of possible next tokens. The trie data structure may obtain the possible next tokens from the FSM 160. Once the trie data structure is generated, the constrained decoding component 155 restricts the LM generation to only allow it to generate the tokens as allowed by the trie data structure.

The possible next tokens are provided to the LM 150 during the generation/inference process so that instead of generating over the entire vocabulary or all the possibilities, the LM 150 will only generate from the possible next tokens provided to it. The LM 150 generates one token at a time to create an entire sequence representing an API call. As the tokens are being generated, the constrained decoding component 155 modifies/updates the possible next tokens the LM 150 can generate from.

For illustration purposes, let's assume that the LM 150 has a vocabulary size of 50,000 tokens and during generation the LM 150 selects one of those tokens. The way that the LM 150 selects the token may be based on probability scores for each of the 50,000 tokens and during generation the LM 150 may select the best/highest probable token. Based on the possible tokens in the trie data structure, the constrained decoding component 155 limits the vocabulary of the LM 150 to 100 tokens, for example, out of the entire vocabulary of 50,000 tokens. In some examples, the constrained decoding component 155 assigns a "0" (or other similarly indicative) probability score to the 49,900 tokens that the LM 150 cannot select, thus, causing the LM 150 to select one of the 100 tokens indicated in the trie data structure.

The FSM 160 may implement at least one state machine that can be in one of a finite number of states at any given time. The FSM 160 can change from one state to another in response to an input(s), and the change from one state to another may be referred to as a transition. The FSM 160 may be defined by a list of its states, its initial state, and the inputs that trigger each transition. Data representing/defining the FSM 160 may be stored in a data storage associated with or included in the FSM 160/the user input processing component 130.

In some embodiments, the FSM 160 defines actions (and corresponding data) supported by the system 100 and available for the LM 150 to select from. The actions may be represented as API calls, where the FSM 160 may include states for API names, states for arguments corresponding to the API names and states for argument values corresponding to the arguments. FIG. 2 is a conceptual diagram illustrating an example of the FSM 160 representing available actions for the LM 150 to select from. As shown, the FSM 160 may include a begin state 210 from which the machine can transition to one of the API states-first API state 215, second API state 230, third API state 240 or Nth API state 260. From the API state, the machine can transition to an argument state, and from the argument state the machine can transition to an argument value state. For example, from the first API state 215, the machine can transition to a first argument state 220 or a second argument state 225; from the first argument state 220 to a value state 224; and from the second argument state 220 to a value state 226. The FSM 160 may also include an end state 290, which may be transitioned to from a value state.

Each state in the FSM represents tokens that the LM 150 is allowed to generate when in that state. For example, when in an API name generation state, the LM 150 is allowed to generate tokens included in the one of the API states 215, 230, 240 or 260. After generating tokens representing an API name, the FSM 160 may transition to an argument state. For example, if the LM 150 generates the API name represented in state 215, then in the argument generation state, the LM 150 is allowed to generate tokens included in the first argument 220 or the second argument 225. After generating tokens representing the argument, the FSM 160 may transition to an argument value state. For example, if the LM 150 generates tokens representing the first argument 220, then the LM 150 is allowed to generate tokens included in the fixed value state 224. Transitions between the states may be guided/determined by the LM 150 as it generates tokens. For example, after the LM 150 has completed generating tokens that represents an entire API name, then the FSM transitions to the argument state.

The FSM 160, in some embodiments, consists of a set of finite states and transitions between pairs of states, triggered by specific inputs. Generation, by the LM 150, of data (e.g., text, tokens, etc.) representing an API call using the FSM 160 can be performed as described below.

The FSM 160 may have a begin state (B) 220 and an end state (E) 290. From the begin state 210, the LM 150 is constrained to/only allowed to generate an available API. Assume there are m API states corresponding to each of the m available/supported API calls. The FSM 160 transitions to a particular API state when the LM 150 generates that particular API call to start.

For each API call $API_i$ ($0 \leq i < m$) with $n_i$ possible arguments, there are an additional $$\sum_{k=1}^{n_i} {}^{n_i}P_k = \mathcal{O}(e^n)$$

ARG states (argument states 220, 225, 235, 245, 250, 265) corresponding to each permutation of possible arguments for that API call. Each of these states correspond to the state of that particular API call with a certain number of arguments filled out in a certain order, making the state space the partial permutation set of all arguments. For example, for a Weather API call with arguments field and location, there are four new states-one corresponding to generating "field" as the first argument (state 220 shown in FIG. 2), one for "location" as the first argument (state 225 shown in FIG. 2), one for generating "field" first and "location" second, and one for generating "location" first and "field" second. In some embodiments, the FSM 160 is configured in this manner (instead of just having a single fixed order of all arguments in the API call) to enable the LM 150 to choose the order and subset of arguments to generate, which can increase the model's accuracy as well.

To allow the LM 150 to skip arguments, transitions from ARG state to the end state E are allowed. In this way, the API call can consist only of arguments generated until that state.

Argument values can either be generated from a set of predetermined values (e.g., levels for a Volume API call) or can be free-text (e.g., a question for an InfoQuery API call). For each ARG state, the FSM 160 has an additional value state—either $V^{fix}$ for generating an argument value from a fixed set (e.g., fixed value states 224, 236, 252, 266), or $V^{un}$ (e.g., free value states 226, 246) to allow unconstrained generation by the LM 150. From each ARG state, the FSM 160 transitions to the V value state when the LM 150 starts generating the argument value. Once generation is complete, the FSM 160 can transition to the next ARG state or the end state E 290.

To allow generation of data representing multiple concurrent API calls, the FSM 160 can include a final state F. Multiple API calls may be generated by the LM 150 when a user input requests multiple actions to be performed, for example, switch off the light and change the thermostat temperature. After the end state E, the FSM 160 can either transition to the begin state B 210 to generate another API call or transition to final state/to signal the end of the whole action/API generation process.

In total, given m APIs, each with $n_i$ arguments, the complete set of states S can be given by:

$$S =$$

$$\{B, E, F\} \cup \{API_i : 0 \le i < m\} \cup \{ARG_{is} : 0 \le i < m, s \in \psi(\{0, 1, \dots n_i\})\} \cup$$

$$\{V_{is}^{un|fix} : 0 \le i < m, s \in \psi(\{0, L \dots n_i\})\}$$

where $\Psi(X)$ is the set of all partial permutations of elements in the set X.

Figure 3:
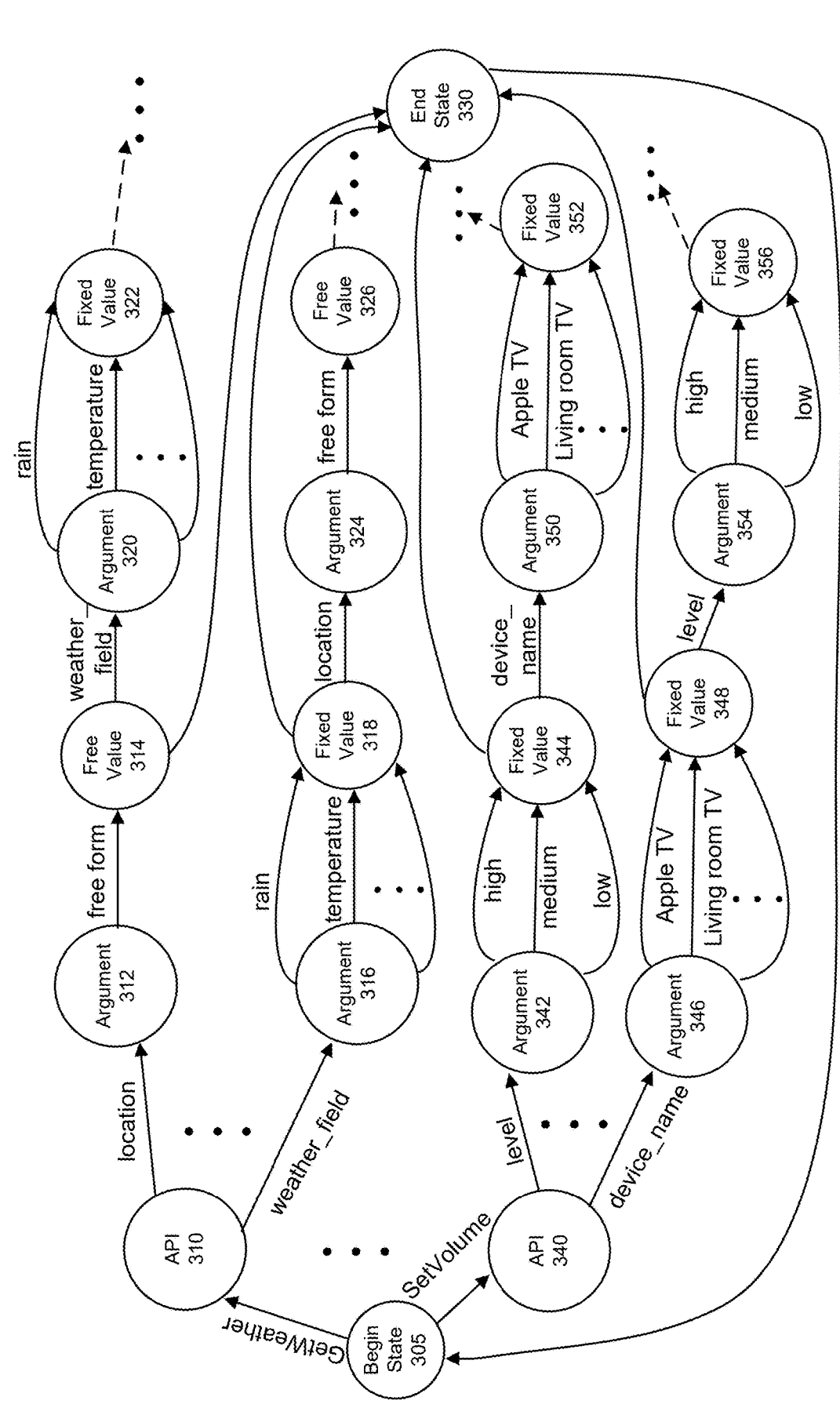
FIG. 3 illustrates an example finite state machine, in accordance with some embodiments of the present disclosure.

FIG. 3 shows a graphical representation of an example of the FSM 160 described herein. The figure shows two example API states expanded along with two of their argument states expanded, while all other states are collapsed by dots.

The two API states expanded in FIG. 3 are GetWeather API 310 and Set Volume API 340. The FSM 160 can transition to any of the allowed argument states from the API state first and from there, then transition to one of the argument value states. Unconstrained value states allow generating free text (e.g., location) and the ones with a fixed set of values (e.g., level) only allow generation of those values. For example, at a begin state 305, a trie data structure may include the possible tokens as each of the available API names, including "GetWeather" and "Set Volume." When the API name generated by the LM 150 is "GetWeather", the state machine transitions to the API state 310, from which the possible next tokens are for the arguments "location" and "weather_field". The trie data structure is updated (or a new trie data structure is generated) to include the possible tokens as "location" and "weather_field." When the argument generated by the LM 150 is "location" the state machine transitions to the argument state 312, from which the possible next tokens is free-form/unconstrained for the argument value. In this case, the trie data structure may be nulled/emptied or no trie data structure may be generated, and the LM 150 may generate tokens in an unconstrained/unrestricted manner. Once the argument value is generated, the state machine transitions to the free value state 314, from which the API call generation can end (the LM 150 may generate tokens/data indicating that API call generation is complete) at the end state 330, or another argument can be generated (the LM 150 may generate tokens indicative of another argument). The trie data structure may be updated to include an "end" token and the possible next tokens as "weather_field". If the LM 150 generates "weather_field" then the state machine transitions to the argument state 320. At this point, the trie data structure may be updated (or a new one may be generated) to include the possible next tokens as the argument values "rain", "temperature", and other values represented in the FSM 160. The LM 150 may generate an argument value from these possible next tokens.

As another example, at the begin state 305, the trie data structure may include the possible tokens as each of the available API names, including "GetWeather" and "SetVolume," and when the API name generated by the LM 150 is "SetVolume", the state machine transitions to the API state 340, from which the possible next tokens are for the arguments "level" and "device_name". The trie data structure is updated (or a new trie data structure is generated) to include the possible tokens as "level" and "device_name." When the argument generated by the LM 150 is "level" the state machine transitions to the argument state 342, from which the possible next tokens are "high", "medium" and "low", the trie data structure is updated to include these possible tokens, and the process may continue as described above.

While the FSM 160 enforces structure, it does not perform any reasoning on which of the available API calls or arguments to generate. Such reasoning is performed by the LM 150 based on its parametric knowledge.

In some embodiments, some of the logical transitions of the FSM 160, such as how to end free text argument value generation, may be described to the LM 150 through directives or examples included in the prompt 145. For example, the prompt 145 may include "To generate unconstrained argument values begin with "<un_start>" and end with "<un_end>".

Once the FSM 160 is engaged, the LM 150 is forced to predict an API call from the catalog. In some embodiments, such as in an AI assistant system, the LM 150 may be configured to also generate system responses to user inputs in addition to determining API calls for performing actions corresponding to the user requests. For example, the LM 150 may perform a generation/reasoning step of determining that an API call to control a user device (e.g., turn volume down, switch on lights, etc.) is to be performed in response to the user input, and may also perform a generation/reasoning step of determining a natural language response to the user input that presents the results of the performed action (e.g., the generated response may be "Volume is turned down" or "Lights are on"). To facilitate this, in some embodiments, the FSM 160 may include a non-API state, which allows unconstrained free-text generation for things like system responses to user inputs (e.g., the LM 150 may generate data representing the system response, where the generated data may not correspond to or may not be based on the FSM). The LM 150 can be configured to follow the non-API route or API-grounding route. With this mechanism, the LM 150 is able to both respond directly or generate a valid API as needed.

In some embodiments, techniques described herein are implemented using a constrained decoding algorithm that relies on a trie structure, which is dynamically built to follow the FSM 160.

Referring to FIG. 1, the constrained decoding component 155 may generate the trie structure. A trie is a type of k-ary search tree that can be used to efficiently store all possible sequences in a set. A trie can be used to query the possible next items given a certain prefix, similar to a compact hashtable. In some embodiments, the trie is defined at the token level to work with LM generation, and the trie determines the allowed next tokens that the LM 150 can generate based on the prefix of tokens generated by the model so far, following the constraints of the FSM 160.

Built dynamically, the trie can contain "holes" that correspond to the unconstrained state in the FSM 160 where free text generation is allowed to generate free-text (unfixed) argument values. Each hole is defined by a special start and special end token in the trie. When the LM 150 generates the special start token (e.g., "<un_start>"), the model generates free text until it generates the special end token (e.g., "<un_end>"). Since these are decisions made by the LM 150, the special start token and special end token are included in the prompt 145 so as to request the LM 150 to generate the end token to get back to a constrained state after the free text generation is completed (e.g., after an argument value has been generated). The free-text data generated by the LM 150 may not correspond to or may not be based on the FSM 160.

In some embodiments, a dynamic trie is used. In other embodiments, a simple trie with predetermined set of all possible sequences can be used. Using a dynamic trie can overcome the issue of having a relatively large simple trie. The dynamic trie can be built dynamically/during runtime as the LM 150 processes, for only a few steps until the next argument or the next API call is ready to be generated. When the LM 150 is ready to generate further, the trie may be extended to include the possible next set of arguments or API calls to choose from. This can help reduce the overall size of the trie to a polynomial $\mathcal{O}(n^2)$.

Below is an example of pseudocode implementing the dynamic trie with holes (for example, implemented by the constrained decoding component 155):

Input: Trie T, LM M, Generated Sequence S=[ ], Unconstrained start and end tokens $U_s$, $U_e$ def Next (M, S, T*)—Returns next token generated by M, constrained by T, with prefix S.

def Complete (S, T)—Returns True if S is complete with respect to sequences in T.

def GenerateAnother ARG(S)—Returns True if S is ready to generate another argument.

def GenerateAnother API(S)—Returns True if S is ready to generate another API.

Steps:

```
 1:        Initialize T with all possible API names
 2:        constrained = True
 3:        while not Complete (S, T) do
 4:            if constrained then
 5:                c_t = next (M, S, T)
 6:            else
 7:                c_t = next (M, S)
 8:            end if
 9:            S = S + [c_t]
10:            if c_t == U_s then
11:                constrained = False
12:            else if c_t == U_e then
13:                constrained = True
14:            end if
15:            if GenerateAnotherARG(S) then
16:                Extend Tby one step to include
                   each of the remaining args
17:            end if
18:            if GenerateAnotherAPI(S) then
19:                Extend Tby one step to include
                   all possible API names
20:            end if
21:        end while
```

Referring to FIG. 1, the LM 150 may generate LM output 165. The LM output 165 may represent tokens generated by the LM 150 based on the constrained decoding component 155 executing constrained decoding in view of the FSM 160. In example embodiments, the LM 150 may generate the LM output 165 representing one or more actions/API calls to be executed. The API calls may be executed using an action plan execution component 545 described below in relation to FIGS. 5-8. Based on execution of the API calls, the LM 150 may receive API call results data, for example, action response data 558 (described below in relation to FIGS. 5-8). The LM 150 may then generate a system response based on the API call results data. The constrained decoding may be applied while the LM 150 generates the API call(s) and may be unapplied while the LM 150 generates the system response after the API calls are executed.

While the LM 150 may generate tokens in sequence, the LM output 165 may represent the entire output generated by the LM 150. In some cases, the LM output 150 may include one or more actions to be performed based on the user input data 127. In some embodiments, the LM output 165 may also include a system response to be presented based on the user input data 127. The LM output 165 may be text or token data representing a natural language output. An example of the LM output 165 is {Action: SetVolume.level ([level]) |System Response: The volume has been set to [level]}. Another example of the LM output 165 is {Action: GetWeather.location ([location]); GetWeather.weather_field (temperature)|System Response: The temperature at location}.

In some embodiments, the LM 150 may generate indicators (e.g., labels, special tokens, tokens that indicate a particular reasoning/generation stage, etc.) representing a processing stage that the LM 150 is performing. In example embodiments, the LM 150 may generate an "Action" indicator to represent that the LM 150 is now generating an action to be performed based on the user input data 127. The tokens generated following the "Action" indicator may represent the action/API call. In example embodiments, the LM 150 may generate a "System Response" indicator to represent that the LM 150 is now generating a system response to be presented based on the user input data 127. The tokens generated following the "System Response" indicator may represent the response.

In some embodiments, the trie search and constrained decoding (performed by the constrained decoding component 155) may be triggered when the LM 150 generates the "Action" indicator. When the "System Response" indicator is generated, the trie search and constrained decoding may be ceased by the constrained decoding component 155. In this manner, the LM 150 can generate tokens without restrictions/constraints for the system response to be presented to the user 105, while generating tokens for API calls is restricted by the valid API information represented in the FSM 160.

FIG. 4 is a flowchart illustrating a process 400 that may be performed by the user input processing component 130, in accordance with some embodiments of the present disclosure. At a step 402 of the process 400, the user input processing component 130 may receive the user input data 127. The user input data 127 may represent a spoken or typed natural language input or other types of user inputs as described herein. At a step 404, the user input processing component 130 may generate the prompt 145 based on the user input data 127. In particular, the prompt generation component 140 may generate the prompt 145 to include the user input data 127 or a representation of the user input data 127. As described herein, the prompt 145 may include other information as well.

At a step 406 of the process 400, the user input processing component 130 may process the prompt 145 using the LM 150 to generate tokens. Based on receiving the prompt 145, the LM 150 may begin generating tokens based on processing the prompt. At a step 408, the user input processing component 130 may determine that the LM 150 generated an "action" token, which may indicate that the LM 150 is now generating an action/API call. In response to the "action" token being generated, at a step 410 the user input processing component 130 may perform constrained decoding using the FSM 160 representing available actions/APIs, as described herein.

At a step 412 of the process 400, the user input processing component 130 may cause the LM 150 to generate a token(s) based on the FSM 160. For example, as described herein, the constrained decoding component 155 may use a trie data structure to represent the allowed/available tokens that the LM 150 can select from, where these tokens are determined based on the FSM 160. In some embodiments, the constrained decoding component 155 may filter out the unallowed tokens from the LM vocabulary (e.g., by assigning a "0" probability score to the unallowed tokens) to cause the LM 150 to only select tokens from the allowed/available tokens (e.g., that have a non-zero probability score). At a step 414, based on the generated token(s), the user input processing component 130 may search for the next possible tokens in the FSM 160. For example, the constrained decoding component 155 may perform a dynamic trie search of the FSM 160 based on the API name generated by the LM 150, and may determine that the next possible tokens represent the one or more argument states that the FSM 160 can transition to from the generated API name. As another example, the constrained decoding component 155 may perform a dynamic trie search of the FSM 160 based on the argument generated by the LM 150, and may determine the next possible tokens represent the one or more value states that the FSM 160 can transition to from the generated argument.

At a decision step 416 of the process 400, the user input processing component 130 may determine whether a "system response" token is generated by the LM 150. As described herein, the LM 150 may generate the "system response" token to represent that now the system response is being generated by the LM 150. If the "system response" token is not generated, then the process 400 may continue to cause the LM 150 to generate tokens based on the FSM 160 (at step 412). In other words, the user input processing component 130 may continue to apply the constrained decoding process. If the "system response" token is generated, then at a step 418, the user input processing component 130 may cease constrained decoding. In other words, the user input processing component 130 may stop application of the constrained decoding process when the LM 150 is ready to generate a system response, so as to not restrict the tokens that can be generated for the system response.

Generation of APIs/actions by the LM 150 is grounded to an available API/actions catalog. However, if a user requests an action that is not supported by the catalog, the LM 150 may generate the closest API/action from the existing APIs. In some embodiments, the LM 150 and the trie algorithm may incorporate evaluation of confidence scores of the generated API calls to determine whether the grounding is reasonable. For example, when the LM 150 generates an API call with a low confidence score, then the system may perform one or more other operations. In one example, the action (and system response) generated by the LM 150 may be not be further processed by the system (e.g., may be discarded, the API call may not be executed, the system response may not be presented to the user, etc.). In another example, the system may output a response that may inform the user that the user's request is not supported by the system, that the system is unable to respond, that the system is unable to understand the user's request, or the like. In another example, the system may cause the LM 150 to re-process based on the user input, by generating another/ updated prompt based on the user input.

In some embodiments, the LM 150 may be a transformer-based seq2seq model involving an encoder-decoder architecture. In an encoder-decoder architecture, the encoder may produce a representation of an input text using a bidirectional encoding, and the decoder may use that representation to perform some task. In some such embodiments, the LM 150 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LM 150 may be pre-trained for approximately 1 trillion tokens. Being trained on CLM tasks, the LM 150 may be capable of in-context learning. An example of such a LM is Alexa generative models.

In other embodiments, the LM 150 may be a decoder-only architecture. The decoder-only architecture may use left-to-right (unidirectional) encoding of the input text. An example of such a LM is the Generative Pre-trained Transformer 3 (GPT-3) and other versions of GPT. GPT-3 has a capacity of (approximately) 175 billion machine learning parameters.

Other examples of LMs and LLMs include BigScience Large Open-science Open-access Multilingual Language Model (BLOOM), Language Model for Dialogue Applications model (LaMDA), Bard, Large Language Model Meta AI (LLaMA), Amazon Titan Foundational Model, etc.

In embodiments, an input to the LM may be in the form of a prompt. A prompt may be a natural language input, for example, an instruction, for the LM to generate an output according to the prompt. The output generated by the LM may be a natural language output responsive to the prompt. The prompt and the output may be text in a particular language (e.g., English, Spanish, German, etc.). For example, for an example prompt "how do I cook rice?", the LM may output a recipe (e.g., a step by step process) to cook rice. As another example, for an example prompt "I am hungry. What restaurants in the area are open?", the LM may output a list of restaurants near the user that are open at the time.

In some embodiments, the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

In some embodiments, the system may determine whether the LM output satisfies certain conditions. Such conditions may relate to checking that the output does not include biased information (e.g., bias towards a protected class), harmful information (e.g., violence-related content, harmful content), profanity, content based on model hallucinations, etc. A model hallucination refers to when a model generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the system may use a knowledge base, web search, etc. to fact-check information included in the output.

In some embodiments, the LM 150 may be fine-tuned to perform one or more tasks described herein. Fine-tuning of the LM may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, the LM 150 may use few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than some of the fine-tuning techniques described above.

In some embodiments, the system may include a machine learning model(s) other than a LM. Such machine learning model(s) may receive text and/or other types of data as inputs, and may output text and/or other types of data. Such model(s) may be neural network based models, deep learning models, classifier models, autoregressive models, seq2seq models, etc.

Various machine learning techniques may be used to train and operate models to perform various steps described herein, such as speech recognition, user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests.

In order to apply the machine learning techniques, the machine learning processes themselves need to be trained. Training a machine learning component may require establishing a "ground truth" for the training examples. In machine learning, the term "ground truth" refers to the accuracy of a training set's classification for learning techniques. Various techniques may be used to train the models including backpropagation, statistical learning, supervised learning, semi-supervised learning, unsupervised learning, stochastic learning, or other known techniques.

Figure 5:
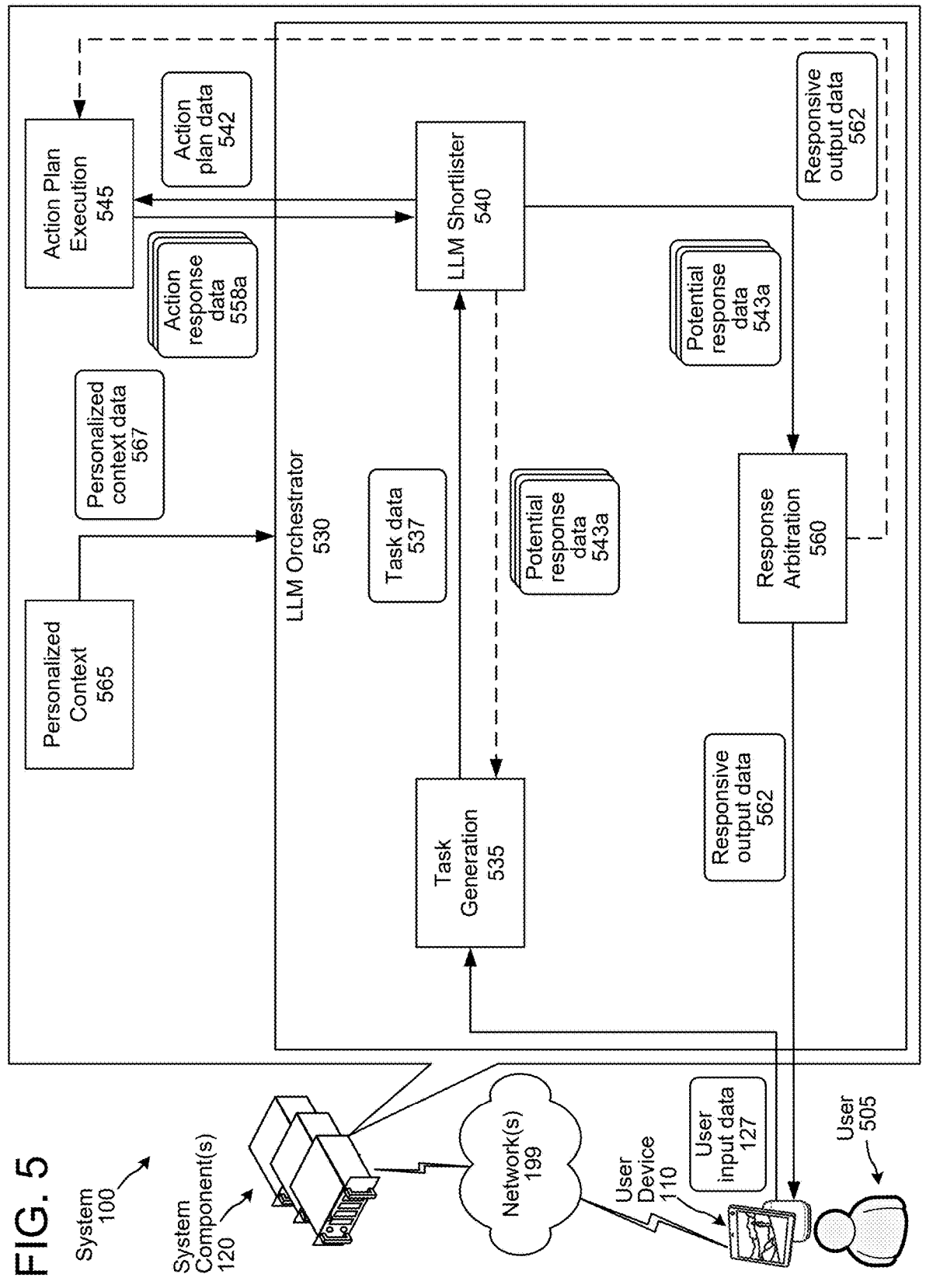
FIG. 5 is a conceptual diagram illustrating example components and processing of a system configured to use a language model(s) to determine a response to a user input, according to embodiments of the present disclosure.

FIG. 5 illustrates further example components included in the system 100 configured to determine an action responsive to a user input. As shown in FIG. 5, the system may include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components, such as a large language model (LLM) orchestrator component 530, a personalized context component 565, and an action plan execution component 545. The LLM orchestrator component 530 may include a task generation component 535, an LLM shortlister component 540, and a response arbitration component 560.

In some embodiments, the LLM orchestrator component 530 may generate prompt data representing a prompt for input to the language models. As shown in FIG. 5, the system component(s) 120 receive user input data 127, which may be provided to the LLM orchestrator component 530. In some instances, the user input data 127 may correspond to various data types, such as text (e.g., a text or tokenized representation of a user input), audio, image, video, etc. For example, the user input data may include input text (or tokenized) data when the user input is a typed natural language user input. For further example, prior to the LLM orchestrator component 530 receiving the user input data 127, another component (e.g., an automatic speech recognition (ASR) component 950) of the system 100 may receive audio data representing the user input. The ASR component 950 may perform ASR processing on the audio data to determine ASR data corresponding to the user input, which may correspond to a transcript of the user input. As described below, with respect to FIG. 9, the ASR component 950 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 950 level of confidence that the corresponding hypothesis represents what the user said. The ASR component 950 may also determine token scores corresponding to each token/word of the ASR hypothesis, where the token score indicates the ASR component's 950 level of confidence that the respective token/word was spoken by the user. The token scores may be identified as an entity score when the corresponding token relates to an entity. In some instances, the user input data 127 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 127).

In some embodiments, the LLM orchestrator component 530 may receive input data, which may be processed in a similar manner as the user input data 127 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 110, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a device 110 (e.g., a smartphone, a smart speaker, etc.) to present an alert to the user. The LLM orchestrator component 530 may process the input data to generate tasks that may cause the foregoing example actions to be performed.

The user input data 127 may be received at the task generation component 535 of the LLM orchestrator component 530, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 100), as described in detail herein below with respect to FIG. 6. For example, for a user input of "What is the weather for today," the task generation component 535 may generate a list of tasks of "(1) determine current outside temperature from thermostat; and (2) determine weather forecast for today" and select the task of "determine weather forecast for today" to be completed first. In instances where the task generation component 535 generates more than one task to be completed in order to perform the action responsive to the user input, the task generation component 535 may further maintain and prioritize the list of tasks as the processing of the system 100 with respect to the user input is performed. In other words, as the system 100 processes to complete the list of tasks, the task generation component 535 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The task generation component 535 may generate and send task data 537 representing the selected task to be completed and various other information needed to perform further processing with respect to the task (e.g., the user input data 127, an indication of the selected task, potential responses associated with previous tasks, the remaining task(s), and context data associated with the user input data 127, as described in detail herein below with respect to FIG. 6) to the LLM shortlister component 540.

The LLM shortlister component 540 may be configured to determine one or more components (e.g., responding component 750a-n, such as APIs, skill component(s) 954, LLM agent component(s), TTS component 956, etc.) configured to perform an action related to the user input or the current task. The LLM shortlister component 540 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the LLM shortlister component 540 may generate requests of "use Weather Application A to determine weather forecast for today" and "use Weather Application B to determine weather forecast for today," or the like. Such requests may be represented in the action plan data 542 sent to the action plan execution component 545. The action plan execution component 545 may identify the request(s) in the action plan data 542, generate executable API calls corresponding to the request(s), and cause the corresponding components (e.g., the responding component 750a-n, such as the API provider component, the LLM agent component, the skill component 954, and/or the TTS component 956) to generate action response data 558a-n representing the requested potential response(s), where individual action response data 558a may be provided by/correspond to a particular responding component 750a—one of the API provider component, the LLM agent component, the skill component 954, and/or the TTS component 956. In some embodiments, the action response data 558a-n may include an identifier (e.g., a component name, an alphanumerical value associated with the component, etc.) for the component providing the data. The LLM shortlister component 540 receives and processes the action response data 558a-n and generates potential response data 543a-n representing the potential response(s) (e.g., relevant potential responses, selected potential responses, ranked potential responses, etc.) for further processing (e.g., as described in detail herein below with respect to FIG. 7). If the LLM shortlister component 540 determines that there are no remaining tasks to generate potential responses for, the LLM shortlister component 540 may send the potential response data 543a-n to the response arbitration component 560.

The potential response data 543a-n, in some embodiments, may be determined based on receiving potential responses from various different components that may be relevant in responding to the user input data 127. For example, the potential response data 543a-n may include a first potential response from a first component configured to perform a first task determined by the task generation component 535, a second potential response from a second component configured to perform a second task determined by the task generation component 535, etc. The potential response data 543a-n can include more than one potential response relating to an individual task. In some embodiments, the potential response data 543a-n may be natural language data.

The response arbitration component 560 processes the potential response data 543a-n to determine whether the potential responses generated for the one or more tasks are responsive to the user input. The response arbitration component 560 processes the potential response data 543a-n (representing at least the generated potential responses) and selects one or more of the potential responses that are determined to be responsive to the user input and/or determines that none of the actions are responsive to the user input. The response arbitration component 560 may output responsive output data 562. For example, the response arbitration component 560 may process the potential response data 543a-n to determine if one or more of the potential responses performable by the API(s) (e.g., the potential responses and/or potential actions) are responsive to the current task. In some embodiments, the response arbitration component 560 may generate a natural language summary of one or more of the selected responses and output the natural language summary as the responsive output data 562. For example, for a user input of "what is the weather for today" and potential responses of "The weather for today is a high of 75 and a low of 68" and "The weather for today is mostly sunny with a slight chance of rain in the evening," the response arbitration component 560 may generate a natural language summary of "The weather for today is expected to be mostly sunny with a high of 75 and a low of 68 and a slight chance of rain in the evening," or the like. The responsive output data 562 may be provided to the action plan execution component 545 for further processing (e.g., for determining, using the TTS component 956, synthesized speech corresponding to the responsive output data 562, for causing the user device 110 to display text, graphics, etc. corresponding to the responsive output data 562, etc.).

Figure 6:
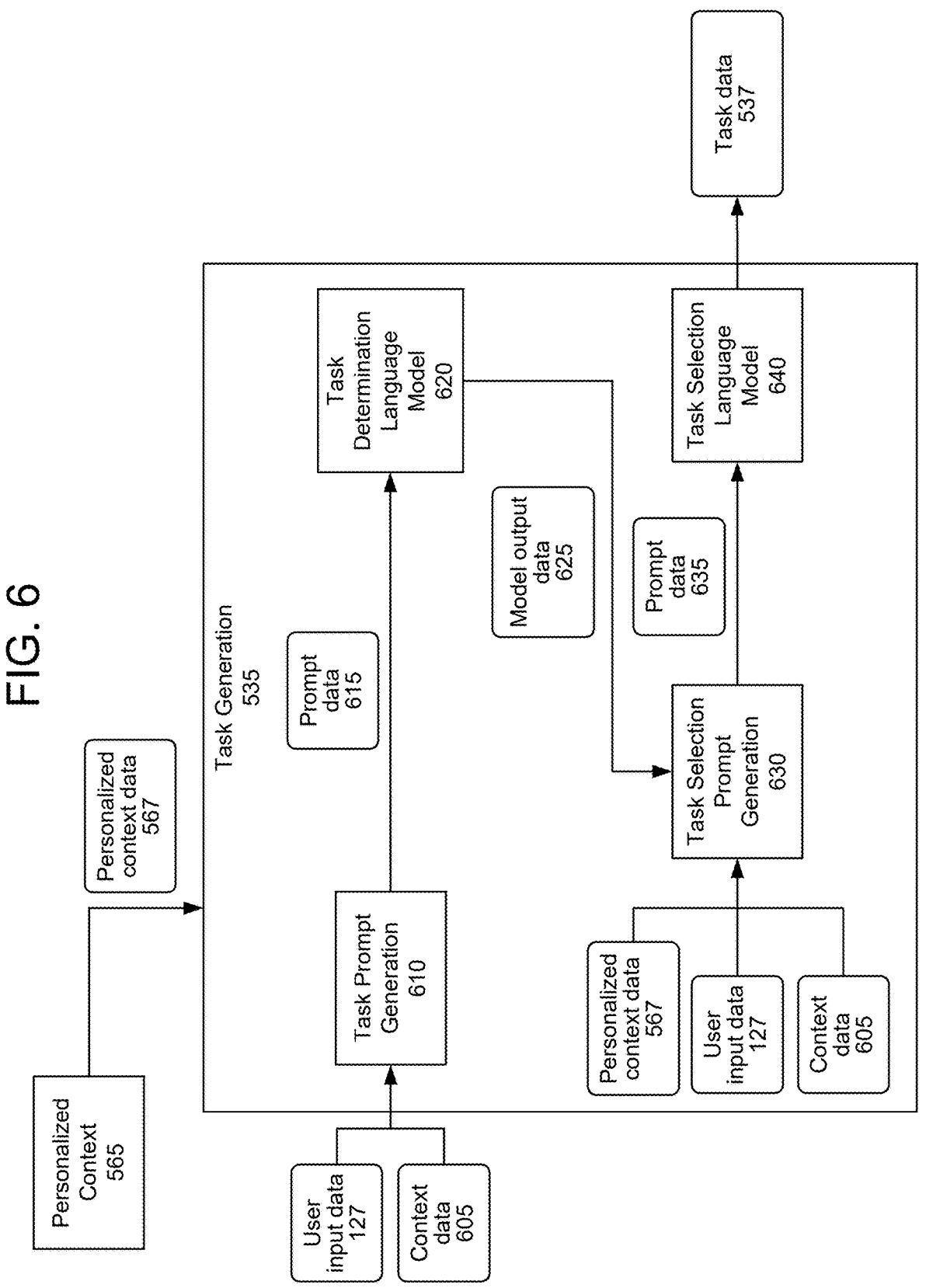
FIG. 6 is a conceptual diagram illustrating example components and processing of a plan generation component of the system, according to embodiments of the present disclosure.

FIG. 6 illustrates example processing of the task generation component 535. As shown in FIG. 6, the task generation component 535 may include a task prompt generation component 610, a task determination language model 620, a task selection prompt generation component 630, and a task selection language model 640.

As further shown in FIG. 6, the user input data 127 is received at the task prompt generation component 610, which is configured to generate a list (e.g., one or more) of tasks (e.g., steps/actions) that are to be completed in order to perform an action responsive to the user input and select a task of the list of the tasks that is to be completed first (e.g., in a current iteration of processing by the system 100).

The task prompt generation component 610 processes the user input data 127 to generate prompt data 615 representing a prompt for input to the task determination language model 620. In some embodiments, the task prompt generation component 610 may further receive an indication of one or more remaining tasks to be completed with respect to the user input data 127. A task to be completed may correspond to a task for which the system 100 has yet to generate potential responses for (e.g., for which the responding component 750*a-n*, such as the API provider component, the LLM agent component, the skill component 5P4, and/or the TTS component 956 have yet to generate action response data for). Similarly, a completed task may correspond to a task for which the system 100 has generated potential responses for (e.g., for which the responding component 750*a-n*, such as the API provider component, the LLM agent component, the skill component 954, and/or the TTS component 956 have generated action response data). For example, if the current iteration of processing with respect to the user input data 127 is a subsequent iteration of processing (e.g., the system previously determined that more than one task is to be completed in order to perform an action responsive to the user input data 127 and has previously generated potential responses for at least a first task of the more than one tasks), then the task prompt generation component 610 may further receive an indication of the remaining tasks to be completed. In such embodiments, the task prompt generation component 610 may further receive an indication of the task(s) to complete processing for and/or the potential response(s) of the processing. The task prompt generation component 610 may further receive the context data 605 representing various contextual signals associated with the user input data 127, such as weather information, time of day, device information associated with the device that sent the user input data 127 (e.g., device ID, device states, historical device interaction data, etc.). Such prompt data 615 may be generated based on combining the user input data 127 and the context data 605 (and, in some embodiments, the indication of the remaining task(s), completed task(s), and/or the potential responses). In some embodiments, the prompt data 615 may be generated further based on the personalized context data 567.

The task prompt generation component 610 may receive the personalized context data 567 from the personalized context component 565. As discussed herein above, the personalized context component 565 may be configured to determine and return contextual information associated with a user input to the one or more components of the system 100, such as the task prompt generation component 610, which the task prompt generation component 610 may combine with the user input data 127 to generate the prompt data 615.

As discussed herein above, the personalized context component 565 may be caused to generate and return the personalized context data 567 based on the system 100 determining that additional information is needed in order to generate potential responses for a task associated with a user input. For example, one or more of the components of the system 100 (e.g., the task determination language model 620, the task selection language model 640, the shortlister language model 740, and/or the response arbitration component 560) may determine that an ambiguity exists in the user input (or the data determined/generated as a result of processing with respect to the user input). In such examples, the personalized context component 565 may receive the user input (e.g., the user input data 127), other data associated with the current task (e.g., one or more portions of the task data 537), and/or model output data indicating that an ambiguity exists/additional information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 565 may process as described herein above to generate the personalized context data 567 (e.g., "The user prefers [Music Streaming Service 1].")

In some embodiments, task prompt generation component 610 (or another component of the system 100) may process the personalized context data 567, the user input data 127, and/or the potential responses associated with the user input data 127 to generate a natural language representation of the user input (represented by the user input data 127) that is updated to include the contextual information of the personalized context data 567 (e.g., a contextual rewrite of the user input). Thereafter, the task prompt generation component 610 may process to generate the prompt data 615 using the updated user input data.

In some embodiments, the prompt data 615 may be an instruction for the task determination language model 620 to determine one or more tasks (e.g., steps/actions) that are to be completed in order to perform an action responsive to the user input given the other information (e.g., the context data 605, the personalized context data 567, the indication of the remaining task(s), the indication of the completed task(s), and/or the corresponding potential responses) included in the prompt data 615.

In some embodiments, the task prompt generation component 610 may also include in the prompt data 615 a sample processing format to be used by the task determination language model 620 when processing the prompt. In some embodiments, the task prompt generation component 610 may generate the prompt data 615 according to a template format. For example, the prompt data 615 may adhere to a template format of:

{
  Create a new task if necessary to help complete a request to [user input data 127 (or a representation of a determined intent of the user input data 127].
  Here are the completed tasks, the potential responses, user inputs, and context so far:
  [completed tasks, potential responses, dialog history, context data 605, personalized context data 567]

These are the remaining tasks to be completed:

[remaining tasks]

Based on the result, create new tasks to be completed, if necessary.

Return the tasks as an array.

}

In some embodiments, the template format may instruct the task determination language model 620 as to how it should process to generate the one or more tasks (e.g., steps) that are to be completed. In some embodiments, the format may further include an indication, such as a label of "User:" indicating that the following string of characters/tokens are the user input. In some embodiments, the format may further include a label of "Thought:" instructing the task determination language model 620 to generate an output representing the determined interpretation of the user input by the task determination language model 620 and/or an action that should be taken (e.g., the user is requesting [intent of the user input], the user is trying to [intent of the user input], need to determine [information needed to properly process the user input], etc.). In some embodiments, the format may further include an indication of "Observation:" indicating the following string of characters/tokens as the result of performance of an action determined by the task determination language model 620/the task determination language model 620's interpretation of the result of the performance of the action determined by the task determination language model 620 (e.g., the completed tasks and/or their potential responses). In some embodiments, the format may further include an indication of "Response:" instructing the task determination language model 620 to generate a response (e.g., one or more tasks to be completed) to the prompt.

Following such a template format, for example, and for a user input of "turn on all of the lights except the garage," the task prompt generation component 610 may generate example prompt data 615a:

{

Create a new task if necessary to help complete a request to turn on all of the lights except the garage.

Here are the completed tasks, their potential responses, user inputs, and context so far:

[ ]

These are the remaining tasks to be completed:

[ ]

Based on the result, create new tasks to be completed, if necessary.

Return the tasks as an array.

}

As an example of a user input that is associated with more than one task, the system 100 may receive a user input of "please order some pizza for dinner" and may determine a task list of "identify user pizza preference" and "find application that enables ordering of pizza." Thereafter, the system 100 may process as described herein below to select and complete the task of "identify user pizza preference." The task prompt generation component 610 may process the user input, corresponding context data, the remaining task list, and the potential responses (e.g., the users pizza preference, determined, for example, by the personalized context component 565) to generate example prompt data 615a:

{

Create a new task if necessary to help complete a request to order some pizza for dinner.

Here are the completed tasks, their potential responses, user inputs, and context so far:

Completed tasks:

Identify user pizza preference: user ordered Brooklyn style pizza from [Pizza Company Name 1]

These are the remaining tasks to be completed:

Find application to order pizza

Based on the result, create new tasks to be completed, if necessary.

Return the tasks as an array.

}

In some embodiments, the task prompt generation component 610 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 615 may include "Please generate a polite, respectful, and safe response and one that does not violate protected class policy."

The task determination language model 620 processes the prompt data 615 to generate model output data 625 representing one or more predicted tasks to be completed in order to perform the action responsive to the user input. For example, based on processing the first example prompt data provided above, the task determination language model 620 may output model output data 625a: {"turn on all of the lights except the garage light,"} or the like. For further example, as discussed above, based on processing prompt data corresponding to the user input "please order some pizza for dinner" the task determination language model 620 may output model output data 625b: {"identify user pizza preference;" "find application that enables ordering of pizza," or the like. After the first task of "identify user pizza preference" is complete, and based on processing the second example prompt data provided above, the task determination language model 620 may further output model output data 625c: {"find an application to order pizza" "find API to order [Pizza Company Name 1] pizza,"} or the like. In some embodiments, the threshold for determining the one or more tasks may be such that the task determination language model 620 is encouraged to generate multiple predicted tasks for a given user input, where the system 100 may parse and filter the list of tasks during downstream processing (e.g., during the processing of the task selection language model 640). For example, based on processing the first example prompt data provided above, the task determination language model 620 may output model output data 625d: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 625 is sent to the task selection prompt generation component 630, which processes the model output data 625 to generate prompt data 635 representing a prompt for input to the task selection language model 640. In some embodiments, such prompt data 635 may be generated based on combining the user input data 127, the context data 605, the personalized context data 567, the prompt data 615, and/or the model output data 625. In some embodiments, the task generation component 535 may include another component that parses the model output data 625 to determine the one or more tasks and may send a representation of the one or more tasks to the task selection prompt generation component 630.

In some embodiments, the prompt data 635 may be an instruction for the task selection language model 640 to select a task of the one or more tasks that is to be completed first (e.g., completed during the current iteration of processing) given the information (e.g., user input data 127, the context data 605, the personalized context data 567, and the one or more tasks) included in the prompt data 635. In some embodiments, the prompt data 635 may further include an instruction for the task selection language model 640 to determine a priority of the one or more tasks (e.g., an ordered list representing the order in which the one or more tasks are to be completed). As discussed above, with respect to the task prompt generation component 610, in some embodiments, the task selection prompt generation component 630 may also include in the prompt data 635 a sample processing format to be used by the task selection language model 640 when processing the prompt. Similarly, in some embodiments, the task selection prompt generation component 630 may generate the prompt data 635 according to a template format, such as:

```
{
Select the top prioritized task given the ultimate goal of
    [user input data 127 (or a representation of a deter-
    mined intent included in the user input data 127]
Here are the completed tasks, their potential responses,
    and user inputs so far:
[completed tasks, potential responses associated with the
    completed tasks, dialog history, context data, person-
    alized context data 567]
Here are the task candidates:
[remaining tasks]
Return your selected task, return None if the goal is
    achieved or indicate existing ambiguities.
}
```

In some embodiments, the template format may instruct the task selection language model 640 as to how it should process to select the task and/or prioritize the one or more tasks. In some embodiments, as discussed above, the format may further include indications of the "User:", "Thought:", "Action:", "Observation:", and/or "Response:" indicators.

Following such a template format, for example, and for the first example user input provided above of "turn on all of the lights except the garage," the task selection prompt generation component 630 may generate example prompt data 635*a*:

```
{
Select the top prioritized task given the ultimate goal of
    turn on all of the lights except the garage
Here are the completed tasks, their potential responses,
    user inputs, and context so far:
[ ]
Here are the task candidates:
Turn on all of the lights except the garage light
Return your selected task, return None if the goal is
    achieved or indicate existing ambiguities.
}
```

For further example, for the second example user input provided above of "please order some pizza for dinner," the task selection prompt generation component 630 may generate example prompt data 635*b*:

```
{
Select the top prioritized task given the ultimate goal of
    please order some pizza for dinner
Here are the completed tasks, their potential responses,
    user inputs and context so far:
```

```
Completed tasks:
    Identify user pizza preference: user ordered Brooklyn
        style pizza from [Pizza Company 1 Name]
Here are the task candidates:
find an application that sells pizza
find API that sells [Pizza Company 1 Name] pizza
Return your selected task, return None if the goal is
    achieved or indicate existing ambiguities.
}
```

In some embodiments, the task selection prompt generation component 630 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 640 processes the prompt data 635 to generate model output data representing the task to be completed first and/or a prioritization of the one or more tasks. For example, based on processing the first example prompt data provided above, the task selection language model 640 may output model output data: {"1. Turn on all of the lights except the garage light,"} or the like. For further example, based on processing the second example prompt data provided above, the task selection language model 640 may output model output data: {"1. Find an API that sells [Pizza Company Name 1] pizza,"} or the like. In some embodiments, during processing of the task selection language model 640 to select and/or prioritize the one or more tasks, the task selection language model 640 may update the task list to remove any redundant and/or conflicting tasks. For example, for the second example prompt data, the task selection language model 640 may determine that the remaining tasks of "find an application that sells pizza" and "find an API that sells [Pizza Company Name 1] pizza" are redundant, and that "find an API that sells [Pizza Company Name 1] pizza has a higher priority. Therefore, the task selection language model 640 may remove the task of "find an application that sells pizza" from the remaining task list. Thereafter, the task generation component 535 (or another component of the task generation component 535) may process the model output data of the task selection language model 640 to determine task data 537 representing the user input data 127, the personalized context data 567, and/or the task selected by the task selection language model 640 to be completed first. In some embodiments, the task data 537 may include the remaining one or more tasks and/or may indicate the prioritization of the one or more tasks, as determined by the task selection language model 640. The task data 537 may be sent to the LLM shortlister component 540, which is described in detail herein below with respect to FIG. 7.

Figure 7:
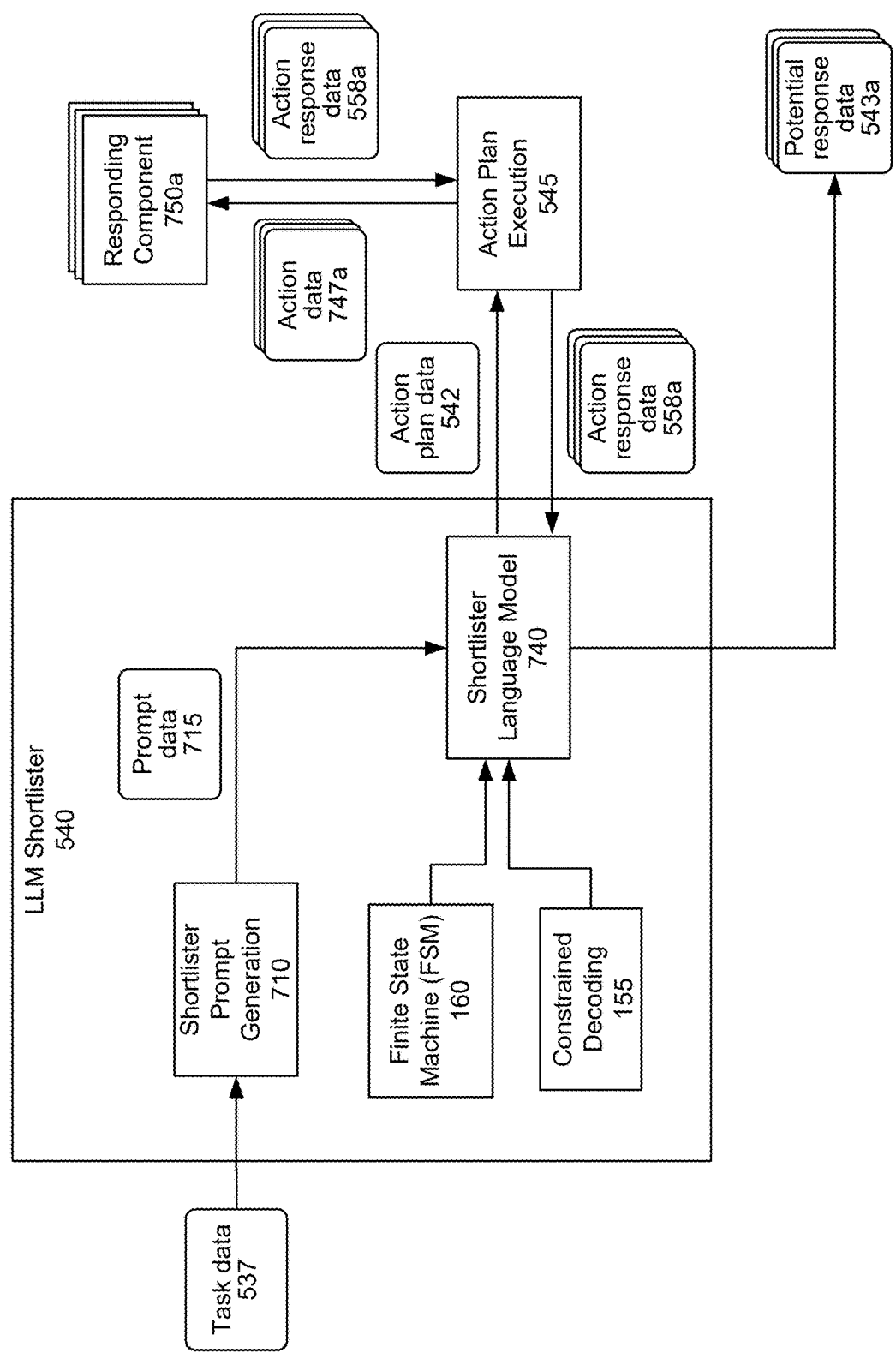
FIG. 7 is a conceptual diagram illustrating example components and processing of an LLM shortlister component of the system, according to embodiments of the present disclosure.

FIG. 7 illustrates example processing of the LLM shortlister component 540. As shown in FIG. 7, the LLM shortlister component 540 may include a shortlister prompt generation component 710, and a shortlister language model 740. In some embodiments, the LLM shortlister 540 may use the constrained decoding techniques described herein. In such embodiments, the shortlister language model 740 may use the FSM 160 and the constrained decoding component 155 in a similar manner as described with respect to the LM 150 and in relation to FIGS. 1-4.

The LLM shortlister component 540 is configured to determine one or more components (e.g., responding component 750*a-n*, such as APIs, skill component(s) 954, LLM agent component(s), TTS component 956, etc.) configured to perform an action related to the user input or the current task. The LLM shortlister component 540 is further configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 7, the task data 537 is received at the shortlister prompt generation component 710. The shortlister prompt generation component 710 processes the task data 537 to generate prompt data 715 representing a prompt for input to the shortlister language model 740. In some embodiments, such prompt data 715 may be generated based on combining the task data 537 (e.g., the user input data 127, the context data 605, the selected task, remaining tasks, potential responses associated with one or more previous tasks, etc.), and the like.

In some embodiments, the prompt data 715 may be a request for the shortlister language model 740 to determine one or more APIs (and/or components) that are to process with respect to the user input or the current task (e.g., determine one or more API calls to cause the APIs (and/or components) to process) given the information (e.g., the user input data 127, the personalized context data 567, and the current task. As discussed above, with respect to the task prompt generation component 610 and the task selection prompt generation component 630, in some embodiments, the shortlister prompt generation component 710 may also include in the prompt data 715 a sample processing format to be used by the shortlister language model 740 when processing the prompt. Similarly, in some embodiments, the shortlister prompt generation component 710 may generate the prompt data 715 according to a template format, such as:

{
    You are an AI agent to find and execute an API to complete the task of [user input data 127/current task]
    Use the following format:
    Action: API calls compatible with the task
    Response: response to the user input
    If no appropriate API is found, respond as nothing is found.
    }

Following such a template format, for example, and for the selected task of "turn on all of the lights except the garage light", the shortlister prompt generation component 710 may generate example prompt data 715a:

{
    You are an AI agent to find an execute an API to complete the task of turn on all of the lights except the garage light
    Use the following format:
    Action: API calls compatible with the task
    Response: summarized results from the API call
    If no appropriate API is found, respond as nothing is found.
    }

For further example, and for the selected task of "find application to order pizza", the shortlister prompt generation component 710 may generate example prompt data 715a:

{
    You are an AI agent to find an execute an API to complete the task of find application to order pizza Use the following format:
    Action: API calls compatible with the task
    Response: summarized results from the API call
    If no appropriate API is found, respond as nothing is found.
    }

The shortlister language model 740 processes the prompt data 715 to generate one or more API calls represented in the FSM 160. As described above, the constrained decoding component 155 may constrain/restrict the tokens that the shortlister language model 740 is allowed to generate from, where the allowed tokens may be determined based on the FSM 160. As such, the shortlister language model 740 can generate valid/supported API calls (including API name, argument and argument values). In some embodiments, the shortlister language model 740 may generate API calls for a subset of the APIs represented in the FSM 160. For example, the FSM 160 may represent an API call {turn_on_device ("[device names]"),}, an API call {[Food Ordering Application 1].order ("Brooklyn style pizza"), an API call: {[Food Ordering Application 2].order("Brooklyn style pizza"),} or the like.

The shortlister language model 740 may generate the one or more API calls based on the constrained decoding component 155 restricting generation of tokens in view of the FSM 160 as described herein.

During processing of the shortlister language model 740 and after generating the one or more requests, the shortlister language model 740 may cause the one or more requests to be executed. For example, as shown in FIG. 7, the shortlister language model 740 may send action plan data 542 representing the one or more requests to the action plan execution component 545, which causes execution of the one or more requests included in the action plan data 542, as discussed in more detail herein below with respect to FIG. 8. For example, the action plan execution component 545 may process the action plan data 542 to generate action data 747a-n. Action data 747a may represent, for example, an instruction (e.g., an executable API call determined from/ generated based on the action plan data 542) for a particular API to process with respect to the user input and/or the current task. In embodiments where the action plan data 542 includes requests corresponding to incomplete API calls, API call formats, indications of actions to be performed by one or more components, the action plan execution component 545 may be configured to generate executable API calls corresponding to the action plan data 542. In some embodiments, the action plan execution component 545 may generate the action data 747a-n to represent an instruction to provide the responses including the potential response(s)/ potential action(s) with respect to the user input and/or current task.

In some embodiments, the shortlister language model 740 may send model output data including the one or more requests to another component of the LLM orchestrator component 530, which may be configured to parse the model output data to identify the one or more requests. Thereafter, the component may generate the action plan data 542 representing the one or more requests and send the action plan data 542 to the action plan execution component 545.

In some embodiments, the constrained decoding component 155 may cease to apply constrained decoding (e.g., un-constrain generation by the shortlister language model 740) when the action plan data 542 is provided to the action plan execution component 545 or when the action response data 558 is received by the shortlisted language model 740. In some embodiments, the shortlister language model 740 may process the action response data 558 without being constrained based on the FSM 160 and may generate the potential response data 543 (representing a potential system response) without restriction(s) in view of the FSM 160 (e.g., the shortlister language model 740 may generate free-form/text for the potential response data 543).

The action plan execution component 545 may send the action data 747*a-n* to the responding component 750*a-n*, such as the API provider component, the LLM agent component, the skill component 954, and/or the TTS component 956. The API provider component may include one or more components (e.g., rule-based components, ML-based components, LLM-based components, or the like) that may be caused to process using the action data 747*a-n* (e.g., using the API calls generated by the LLM shortlister component 540).

The TTS component 956 may be configured to process textual or tokenized input to generate audio data representing synthesized speech corresponding to the textual or tokenized input spoken by a synthetic voice. The processing of the TTS component 956 is discussed in detail below with respect to FIG. 9.

The skill component 954 may be software running on the system component(s) 120 that is akin to a software application. That is, a skill component 954 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 954. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 954 may operate in conjunction between the system component(s) 120 and other devices, such as the user device 110, in order to complete certain functions. A skill component 954 may include hardware, software, firmware, or the like that may be dedicated to a particular skill component 954 or shared among different skill components 954.

The LLM agent component may correspond to one or more LLM agents. An LLM agent component may correspond to a custom instantiation of an LLM (and other components) that is configured to handle user inputs relating to a particular domain/functionality. In some embodiments, the LLM agent component may be configured to handle specific use cases via particular prompt generation, fine-tuning of the LLM, etc. For example, the LLM agent component may be configured to handle user inputs/tasks related to information query, the LLM agent component may be configured handle user inputs/tasks related to shopping, the LLM agent component may be configured to handle user inputs/tasks related to ordering food from various restaurants, the LLM agent component may be configured to handle user inputs/tasks related to ordering food from a particular restaurant (e.g., a particular pizza restaurant), the LLM agent component e may be configured to handle user inputs/tasks related to booking a hotel, the LLM agent component may be configured to handle user inputs/tasks related to booking a flight, etc.

The API provider component may include various components that may be caused to execute using the action data 747*a-n*. For example, the API provider component may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 747*a-n* may include an indication(s) (e.g., slots) of one or more entities included in the user input, as determined by one or more of the language models 620, 640, 740, in which case the ER component may process to link the one or more entities to the specific, referenced, entity known to the system 100.

In other embodiments, the ER component may be configured to process the action data 747*a-n* to determine the one or more entities included in the user input and link the one or more determined entities to the specific, referenced, entity (entities) known to the system 100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component may include a search component, which may be configured to query a storage (e.g., a database, repository, knowledge base, etc.) for information usable for generating a response to a user input. For example, if the action data 747*a-n* represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component may include the device controller component discussed herein above, which may be further configured to cause a device to perform an action corresponding to the action data 747*a-n*.

In some embodiments, the API provider component may include a domain service component, which may be configured for interacting with one or more services defined by particular users, such as developers, specialists, or the like (e.g., to receive information, such as responses or annotations, to cause an action.

One or more of the responding components 750a-n may send action response data 558a-n representing one or more potential responses generated by the one or more APIs corresponding to the action data 747a-n (e.g., the potential response(s) and/or potential action(s)) to the action plan execution component 545. For example, in response to an API call to the skill component 954 associated with a user input for turning on a light, the action response data 558a may correspond to a potential action of "turn on the light," "turn_on_device ("light ", [device ID])", or the like. For further example, in response to an API call to the skill component 954 associated with a user input for ordering a pizza from a particular restaurant, the action response data 558b may correspond to a potential action of "order medium pizza from [restaurant name]", "order_pizza ("medium", "pizza", "[restaurant name]")", or the like. The action plan execution component 545 may send the action response data 558a-n to the shortlister language model 740.

In some embodiments, the action plan execution component 545 may send the action response data 558a-n to the shortlister prompt generation 710, which may generate further prompt data including the action response data 558a-n and be sent to the shortlister language model 740. For example, the further prompt data may be generated based on combining the prompt data 715 and the action response data 558a-n.

In some embodiments, the shortlister language model 740 may process the action response data 558a-n (or the further prompt data including action response data 558a-n) to generate a natural language summary of the action response data (e.g., the potential response data 543a-n). In some embodiments, the potential response data 543a-n may include an association between action response data 558a (or a summarized representation of the action response data 558a) and an indication of the API/component that generated the action response data 558a (e.g., a component identifier, component description, etc.). In some embodiments, the shortlister language model 740 may be configured to filter and/or rank the action response data 558a-n based on how relevant the action response data 558a-n is to the current task. In some embodiments, the shortlister language model 740 may be configured to filter and/or rank the action response data 558a-n based on a confidence level of the component that provided the action response data, where the confidence level may indicate a likelihood of the component being able to respond (e.g., within a period of time), the component being able to perform a potential action that corresponds to the current task, etc. In some embodiments, the action response data 558a-n may indicate whether or not the corresponding component is able to respond (e.g., the action response data 558a may include a Boolean value such as "yes" or "no" or other similar indications). In some embodiments, the shortlister language model 740 may filter and/or rank the action response data 558a-n based on information included in the prompt data 715 (e.g., the user input data 127, the context data 605 the personalized context data 567, the prompt data 615, etc.). For example, the potential response data 543a-n may include a subset of the action response data 558a-n (or the summarized representations of the action response data 558a-n) and may further include a representation of a confidence associated with the action response data 558a (or a summarized representation of the action response data 558a). As such, the potential response data 543a-n may further include data representing a confidence of how relevant the action response data 558a is to the current task. In some embodiments, the shortlister language model 740 may consider a rating associated with the component that provided the action response data 558a, where the rating may be a user satisfaction rating provided by multiple different users of the system 100, a user satisfaction rating provided by the user 105 associated with the user input data 127, a system generated rating based on the number of past tasks handled by the component, a accuracy rating based on the number of past tasks the component had handled correctly/provided a desired response for, etc.

The LLM shortlister component 540 may send the potential response data 543a-n for further processing. In instances where the task generation component 535 determined that more than one task is to be completed, the LLM shortlister component 540 may send the potential response data 543a-n to the task generation component 535, which may process as described herein above to maintain and prioritize the task list based on the potential response data 543a-n and select a new task to be completed. In instances where the task generation component 535 determined that only one task is to be completed, or in instances where the LLM shortlister component 540 determines that there are no remaining tasks to be completed, the LLM shortlister may send the potential response data 543a-n, and the potential responses associated with previously completed tasks (e.g., previous action response data) to the response arbitration component 560 to process as discussed herein above. The LLM shortlister component 540 may further send the user input data 127, the context data 605, the personalized context data 567, etc., to the task generation component 535 and/or the response arbitration component 560.

In some embodiments, the LLM orchestrator component 530 may further include a memory storage (not illustrated) which may store various information associated with the processing performed (e.g., user input data 127, the prompt data 615, the context data 605, the personalized context data 567, the model output data 625, prompt data 635, the task processing data 537, the prompt data 715, the action plan data 542, the action response data 558a-n, the potential response data 543a-n, etc.) during one or more previous iterations of processing by the LLM orchestrator component 530 for the user input data 127. As such, after the LLM shortlister component 540 generates the potential response data 543a-n, the LLM orchestrator component 530 may send the abovementioned data to the memory storage. In some embodiments, the above-mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 610 may receive one or more portions of the data included in the memory storage (which were generated during one or more previous iterations of processing performed with respect to the user input data 127) and include the one or more portions of data in the prompt data 615.

As discussed herein above, the shortlister language model 740 may be configured to determine whether additional information is needed in order to complete the current task (e.g., if an ambiguity exists in the user input data 127 or the current task, if the current task is to resolve an identified ambiguity, if an API argument is missing from the user input or other available data, etc.), in which case the shortlister language model 740 may send data representing a request for such additional information to the response arbitration component 560. In some embodiments, the action plan data 542 may represent the request for additional information, and the action plan execution component 545 may be configured to send corresponding action data 747 to the personalized context component 565. For example, for the example provided herein above with respect to ordering pizza, the shortlister language model 740 may determine that in order to resolve an ambiguity with respect to the user input data 127 or current task (e.g., based on the current task being to resolve the ambiguity or a determination that the current task cannot be completed due to the ambiguity), the system 100 must "identify user pizza preference," or the like. The system 100 may send a request to the personalized context component 565 to "identify user pizza preference" and the personalized context component 565 may process as described herein above to return personalized context data resolving the ambiguity (e.g., the user's pizza preference may be determined to be a cheese pizza or a pepperoni pizza).

As shown in FIG. 8, the action plan execution component 545 may further include an LLM action resolution component 865, an action creation component 880, an action execution component 885, and an action validation component 870. In some embodiments, the system 100 may further include an action repository 875.

As further shown in FIG. 8, the action plan data 542 may be received at the LLM action resolution component 865. The LLM action resolution component 865 processes the action plan data 542 to resolve the one or more requests included in the action plan data 542 into one or more executable API calls (e.g., the executable API data 866*a-n*), which may include one or more parameters usable to cause the corresponding components to generate the potential responses. In some embodiments, the parameters may be associated with (or related to) the user input data 127.

The LLM action resolution component 865 may determine the one or more executable API calls using the action repository 875. The action repository 875 may store data associated with requests that may be generated by the LLM orchestrator component 530. For example, the action repository 875 may store API descriptions representing functions performable by components of the system 100. In some embodiments, an API description may include a description of the one or more functions performable by the API/component, a description of one or more parameters to be included in an executable API call usable to cause the API/component to perform the one or more functions, one or more parameter types (e.g., "user ID," "device ID," "location," "user name," etc.) associated with the one or more parameters, exemplars representing example user inputs associated with the API/component, example requests output by the LLM orchestrator component 530 that are associated with the API/component, corresponding executable API calls for causing the API/component to perform the example functions, and corresponding potential responses generated by the API/component. In some embodiments, an API description may be stored in association with one or more example requests output by the LLM orchestrator component 530. For example, an example request of "please turn on the kitchen lights," may be stored in association with an API description including a description of "usable to power on a device," an example executable API call of "turn_on_device (device="kitchen light")," a description for the parameter of "kitchen light" of "target device identifier for the device to be powered on," and/or a parameter type associated with the parameter of "device ID."

The LLM action resolution component 865 may query the action repository 875 for API descriptions associated with the requests included in the action plan data 542. The action repository 875 may determine API data 877 representing API descriptions (according to the query for API descriptions associated with the requests), and may send the API data 877 to the LLM action resolution component 865. In some embodiments, the API descriptions may be included in the API data 877 based on them being semantically or lexically similar to the requests included in the action plan data 542. For example, the action repository 875/the LLM action resolution component 865 may be capable of comparing (e.g., using cosine similarity) (an encoded representation of) a request to (an encoded representation of) an API description to determine a semantic similarity between the request and the API definition (e.g., a semantic similarity between the request and a natural language description of the functionality of the API/component included in the API description). If the API description is determined to be semantically similar to the request, then the corresponding API description, from the action repository 875, may be included in the API data 877. In some embodiments, the API data 877 may include the top-n identified API descriptions. In some embodiments, API descriptions may be included in the API data 877 based on the corresponding example request being (semantically or lexically) similar to the requests in the action plan data 542.

In some embodiments, the LLM action resolution component 865 may process authentication credentials 867 associated with the user input data 127. The authentication credentials 867 may represent credentials (e.g., encrypted security token, log-in credentials, and/or any other data unique to the user 105 and/or the user device 110) usable for authenticating the identity of the user 105 that provided the user input and/or the user device 110 that captured the user input. The LLM action resolution component 865 may compare the authentication credentials 867 to validated authentication credentials corresponding to the user 105 and/or the user device 110. For example, in the instance where the authentication credentials correspond to an encrypted security token representing the identity of the user, the LLM action resolution component 865 may identify a decryption key for decrypting the authentication credentials and compare the decrypted authentication credentials to one or more validated authentication credentials corresponding to the user 105.

In some embodiments, the authentication credentials 867 may be sent to the LLM action resolution component 865 by an orchestrator component 930, which may be determined as a result of user recognition processing (e.g., performed by the user recognition component 995). In some embodiments the LLM action resolution component 865 may query the orchestrator component 930 for the authentication credentials 867.

In some embodiments, the LLM action resolution component 865 may further receive context data 869 including various contextual information associated with the user input. In some embodiments, the context data 869 may include information that is not provided to the LLM orchestrator component 530, that is, data unassociated with the processing performed by the LLM orchestrator component 530, such as information associated with the user that provided the user input and/or the device that captured the user input. In some embodiments, such information may include user recognition results, a user ID, user profile information, device ID, device profile information, device state indicators, location, language, geographic marketplace, etc. In some embodiments, the context data 869 may further include dialog history data and/or interaction history data associated with the use and/or the device. For example, after validating the authentication credentials 867, the LLM action resolution component 865 may query one or more components of the system (e.g., the orchestrator component 930, a profile storage 970, the personalized context component 565, etc.) for contextual information associated with the authentication credentials 867 (e.g., associated with the user 105 and/or the user device 110 corresponding to the authentication credentials 867).

As discussed above, such context data 869 may not be provided to the LLM orchestrator component 530 because it may not be beneficial to the processing by one or more language models implemented in the LLM orchestrator component 530 (e.g., not beneficial to the processing to generate the action plan data 542) and/or for user-privacy/security reasons. Not providing such information to the LLM orchestrator component 530 may result in more efficient processing by the language models when generating the action plan data 542 by removing unnecessary information from consideration by the LLM orchestrator component 530 (e.g., so as to not waste processing cycles on information not usable to generate the action plan data 542). As such, the context data 869 may be sent to the action plan execution component 545 to generate the fully executable API call including parameters corresponding to the context data 869 (e.g., corresponding to the information not processed on/considered by the LLM orchestrator component 530). In some embodiments, some components of the LLM orchestrator component 530 may receive the context data 869, while other components of the LLM orchestrator component 530 may not receive the context data 869.

In some embodiments, after receiving the action plan data 542 and/or the context data 869, the LLM action resolution component 865 may send the action plan data 542 and/or the context data 869 to the action validation component 870. The action validation component 870 processes the action plan data 542 and/or the context data 869 to determine whether (execution of an API call(s) corresponding to) one or more of the requests included in the action plan data 542 are in conflict with a system operating policy. A request may be in conflict with a system operating policy if execution of the request may, for example, result in unsafe device operation, an undesired/unintended action, subject the user to a negative experience, and/or result in the divulgence of sensitive and/or confidential information. For example, the action validation component 870 may determine that execution of one or more of the requests are in conflict with a system operating policy based on determining that execution of the requests may result in a unsafe device operation such as, for example, a request of "open the door," "unlock the front door," "open the garage door," etc. For further example, the action validation component 870 may determine that execution of one or more of the requests is in conflict with a system operating policy based on determining that execution of the requests in the action plan data 542 may result in an undesired/unintended action such as turning a light switch on and off 10 times or divulgence of sensitive and/or confidential information, such as sending log-in credentials, payment information, etc. to a third party.

In some embodiments, the action validation component 870 may further be configured to determine whether the requests are inappropriate and therefore should not be executed. For example, the action validation component 870 may determine that execution of the requests in the action plan data 542 may be inappropriate, such as use/disclosure of sensitive information (e.g., financial information, medical information, etc.), explicit material (e.g., mature content), etc.

The action validation component 870 may identify a request as potentially in conflict with a system operating policy based on various factors. For example, the action validation component 870 may determine a request is potentially in conflict with a system operating policy based on determining the request is semantically similar to a request known to be in conflict with a system operating policy. For example, the action validation component 870 may compare the request to one or more requests known to be in conflict with a system operating policy (e.g., unsafe device operations, such as controlling a door, controlling a lock, etc.). Based on determining the request matches/meets a threshold of semantic similarity with the one or more requests known to be in conflict with the system operating policy, the action validation component 870 may determine that the request is potentially in conflict with the system operating policy. In some embodiments the one or more requests known to be in conflict with a system operating policy may include a request(s) previously determined to potentially be in conflict with a system operating policy.

For further example, the action validation component 870 may further determine whether the request includes one or more words known to be associated with a request(s) that is known to be in conflict with a system operating policy (e.g., explicit words, words associated with sensitive information (e.g., credit card, debit card, bank, social security number, address, log-in credentials, phone number, etc.), medical information (e.g., medication, prescriptions, etc.), and/or other words such as "open," "unlock," etc.). As another example, the action validation component 870 may determine a request is potentially in conflict with a system operating policy based on determining the request is unassociated with (e.g., semantically dissimilar to) the user's original request (e.g., the user input), such as if the user's request was "What is the weather today" and the request is "unlock the front door."

As an additional example, the action validation component 870 may determine a request is potentially in conflict with a system operating policy further based on the context data 869, such as if the request is "unlock the front door," but the user that provided the corresponding user input is not currently home/within a proximity of their home. As an even further example, the action validation component 870 may determine a request is potentially in conflict with a system operating policy based on determining that the request cannot be resolved into a corresponding executable API call, such as if an API corresponding to the request cannot be identified, an executable API call cannot be generated for the request (e.g., information required to determine one or more parameters of the API call is unavailable, etc.).

In some embodiments, the action validation component 870 may determine that a request is in conflict with a system operating policy further based on the request corresponding to a subject matter/topic category. For example, the action validation component 870 may use a machine learning (ML) model(s) (e.g., a topic classification model) to determine a category corresponding to the request (e.g., a smart home device operation category, financial information category, purchase category, etc.), and if the determined category is in a stored list of policies, then the action validation component 870 may determine that the request is in conflict with a system operating policy.

In some embodiments, the action validation component 870 may determine that a request is in conflict with a system operating policy further based on the API/component that generated the information included in the request and/or the API/component that is process with respect to the request. For example, if the API/component that generated the request is external to the system 100 (e.g., a device manufactured by 3rd party, a 3rd party application, 3rd party skill component, a 3rd party website, etc.), then that may indicate to the action validation component 870 that the request is potentially in conflict with a system operating policy as the system 100 may not be able to guarantee the validity/safety of the corresponding information received from the component. For further example, if the API/component that is to process with respect to the request is external to the system 100 (e.g., a device manufactured by 3rd party, a 3rd party application, 3rd party skill component, a 3rd party website, etc.), then that may indicate to the action validation component 870 that the request is potentially in conflict with a system operating policy as the system 100 may not be able to guarantee the validity/safety of the processing performed by the API/component with respect to the request and/or the corresponding potential response data received from the API/component.

In some embodiments, the action validation component 870 may be configured to modify the execution of the one or more requests based on one or more of the determinations discussed above. For example, in some embodiments, the action validation component 870 may be configured to suspend and/or preempt performance of a request (e.g., execution of the corresponding executable API call) determined to potentially be in conflict with a system operating policy until authorization to perform the request is received by a user. As such, the action validation component 870 may insert a new request into the action plan data 542 representing that a request for authorization is to be output and an order in which the new request is to be executed in (e.g., an indication that the new request is to be performed prior to the suspended and/or preempted request). For example, in response to an request of "open the garage door," the action validation component 870 may determine that execution of such a request may potentially be in conflict with a system operating policy (e.g., unsafe device operation such as, in this instance, potentially allowing for unwanted access to the user's home) and may insert a request into the action plan data 542 (or otherwise provide an indication to the LLM action resolution component 865) representing that authorization to open the garage door should be requested from the user prior to causing the garage door to be opened.

For further example, in some embodiments, the action validation component 870 may be configured to filter the action plan data 542 for requests (or portion of a request) determined to potentially be in conflict with the system operating policy. As such, in response to a request of "turn the light on and off 10 times," the action validation component 870 may determine that performance of the request is potentially in conflict with a system operating policy (e.g., an undesired/unintended action of turning the light on and off multiple times) and may remove the request from the action plan data 542. Similarly, if the action validation component 870 determines that a request is not supported by an API, not enough information is available to generate an executable API call, etc., the action validation component 870 may remove the request from the action plan data 542 or may associate an indicator (e.g., a label, a tag, a flag, etc.) with the request for another component of the system 100 to perform additional processing with respect to the request. In such embodiments, the action validation component 870 may include in the action plan data 542 (or otherwise provide to the LLM action resolution component 865) an indication that the request was removed. In some embodiments, the action validation component 870 may be configured to filter a portion of the request that is in conflict with the system operating policy. For example, for the request "turn the light on and off 10 times," the action validation component 870 may filter the request to become "turn the light on," or the like. The action validation component 870 may generate action validation data 872 representing whether performance of one or more of the requests were modified and representations of the modified requests, and send the action validation data 872 to the LLM action resolution component 865.

In some embodiments, the action validation component 870 may determine whether a request included in the action plan data 542 is a potential security concern using an ML model. For example, the ML model may process a request included in the action plan data 542 (and optionally a representation of the user input, which may also be included in the action plan data 542, and/or the context data 869) and generate an indication of whether execution of the request may be in conflict with a system operating policy. During training, the ML model may take as input a plurality of training tuples including a request to be executed and an indication of whether execution of the request is in conflict with a system operating policy (and, optionally, a user input associated with the request and/or contextual information associated with the user input (e.g., dialog history data, interaction history data, user profile information, device profile information, etc.)), where, for a given training tuple, the ML model is tasked with correctly classifying execution of the request as being in conflict with a system operating policy or not. Based on whether the ML model correctly classifies the request or not, one or more values (e.g., weights) of the ML model may be configured. In some embodiments, the ML model may further task as input one or more indicators of the determinations of the action validation component 870 discussed herein above (e.g., whether the request (or one or more words included in the request) is semantically similar to a request known to be in conflict with a system operating policy, a subject matter/ topic category corresponding to the request, an indication of the API/component that generated the information included in the request, an indication of the API/component that is to process with respect to the request, etc.)

In some embodiments, the action validation component 870 may be periodically updated to identify additional requests that may be in conflict with a system operating policy. For example, additional logic and/or training data may be provided to the action validation component 870 (or the ML model) in real time so that the action validation component 870 (or the ML model) may be configured to identify any additional requests potentially in conflict with a system operating policy.

The LLM action resolution component 865 may process the API data 877, the action plan data 542, and/or the context data 869 to generate executable API data 866*a-n* corresponding to one or more executable API calls usable to cause one or more components/APIs to generate potential responses to the user input. The LLM action resolution component 865 may resolve the parameters included in the executable API data 866*a-n* using the API data 877, the action plan data 542, and/or the context data 869. For example, for a request included in the action plan data 542 of "Please turn on the kitchen light", the corresponding target device identifier (e.g., included in the action plan data 542 or the context data 869) of "Kitchen device 1," and the corresponding API call format (e.g., included in the API data 877) of "turn_on_device (device=[device name])," the LLM action resolution component 865 may generate executable API data 866a of "turn_on_device (device=" Kitchen device 1")."

The LLM action resolution component 865 may use various techniques to generate a parameter included in the executable API call, for example, using the API data 877, the action plan data 542, and/or the context data 869. In some embodiments, the LLM action resolution component 865 may generate a parameter included in the executable API call based on determining a parameter type associated with information included in the action plan data 542 or the context data 869 corresponding to an identifier in the API description that corresponds to the parameter. For example, for a request (included in the action plan data 542) of "What is the capital of France," the LLM action resolution component may process as described above to generate API data 877 including an API call format of InfoQA.get_answer ({"question": "user input"}) including the parameter type of "user input" for the parameter to be included in the executable API call. The LLM action resolution component 865 may use the action plan data 542 and the API data 877 to generate an executable API call of InfoQA.get_answer ({"question": "What is the capital of France"}) based on the action plan data 542 including natural language of "What is the capital of France" and a parameter type associated with the natural language data of "user input."

As discussed above, the LLM action resolution component 865 may further generate a parameter included in the executable API call using context data 869 representing information that may not be provided to the task generation component 535 or the LLM shortlister component 540. For example, for a request (included in the action plan data 542) of "Play my workout music playlist," the system 100 may process as described herein above to generate API data 877 including an API call format of play_music_playlist (user="user ID"], playlist="workout") including the parameter type of "user ID" for the parameter to be included in the executable API call. The LLM action resolution component 865 may process the action plan data 542, the API data 877, and the context data 869 to generate an executable API call of "play_music_playlist (user=[user ID 1], playlist= "workout ")" based on context data 869 including contextual information of "[user ID 1]" associated with a parameter type of "user ID."

Additionally, or alternatively, in some embodiments, the LLM action resolution component 865 may generate a parameter included in the executable API call using one or more associations (e.g., mappings) between the parameter type associated with the parameter to be included in the executable API call and a parameter type associated with information included in the action plan data 542 or the context data 869. Such an association may represent an alternative parameter type(s) that is associated with data corresponding to the parameter. In such embodiments, the API data 877 (e.g., the API descriptions included in the API data 877) may further include one or more associations for a parameter type associated with a parameter to be included in an executable API call. For example, for a parameter type of "user ID" associated with a parameter to be included in the executable API call, the corresponding API description may further include an association with "customer ID", "user identifier", "customer identifier", or the like, indicating that data associated (e.g., labeled) with those parameter types may also correspond to the parameter. The LLM action resolution component 865 may use these associations to generate a parameter included in the executable API call. For example, for an action of "Turn on the kitchen light," a target device of "kitchen light 1," a parameter type associated with the target device of "device ID," and API data 877b including an API call format of turn_on_device (device="device name") including the parameter type of "device name" for the parameter to be included in the executable API call, the LLM action resolution component 865 may generate an executable API call of turn_on_device (device="Kitchen light 1") based on determining that an association corresponding to the parameter type "device name" includes the parameter type "device ID."

In some embodiments, the LLM action resolution component 865 may be configured to generate the executable API data 866a-n for one or more of the requests included in the action plan data 542 without querying the action repository 875. For example, the LLM action resolution component 865 may be further configured to recognize certain requests and transform them into the corresponding executable API data 866a-n, without querying the action repository for the corresponding API data 877. In some embodiments, the LLM action resolution component 865 may include logic for generating the executable API data 866a-n for requests determined to be popular (e.g., requests generated 5 or more times in the last week). In some embodiments, the LLM action resolution component 865 may further store data representing recent, previous request-to-executable API action data transformations, such that if a same or similar request is received in the future, the LLM action resolution component 865 may generate the corresponding executable API data 866a-n without querying the action repository for the API data 877.

In some embodiments, the LLM action resolution component 865 may be configured to determine an order in which the executable API data 866a-n is to be executed. For example, as discussed herein above, the action plan data 542 may include an indication of the prioritization of one or more of the tasks associated with the one or more requests included in the action plan data 542. The LLM action resolution component 865 may use the prioritization to determine an order in which the executable API data 866a-n is to be executed. In some embodiments, the executable API data 866a-n may include an indication of the order.

The executable API data 866a-n may be sent to the action creation component 880. The action creation component 880 may process to generate additional executable API data 882a-n representing one or more additional requests that were not explicitly indicated/predicted by the LLM orchestrator component 530 (e.g., not included in the action plan data 542). Although the one or more additional requests were not included in the action plan data 542, in some embodiments, one or more of the additional requests may be associated with one or more of the requests included in the action plan data 542. In such embodiments, one or more of the additional requests may represent sub-requests to be performed in addition to (e.g., prior to, concurrently, partially in parallel to, after) the one or more requests included in the action plan data 542.

As such, in some embodiments, the action creation component 880 may generate the additional executable API data 882a-n based on processing the executable API data 866a-n. For example, the action creation component 880 may generate the additional executable API data $882a$-$n$ using an association (e.g., mapping) between requests and additional requests. The action creation component 880 may have access to the associations between one or more system-generated requests (e.g., requests that may be generated by the LLM orchestrator component 530) and one or more additional requests. As such, if one or more of the requests included in the action plan data 542/represented by the executable API data $866a$-$n$ are associated with one or more additional requests, then the action creation component 880 may generate additional executable API data $882a$-$n$ representing the additional requests. For example, a first association might represent that a request for TTS to be performed on text (or tokens) is associated with an additional request of performing content moderation on the text (or tokens). Therefore, in response to determining first executable API data 866a corresponds to performing TTS processing, the action creation component 880 may generate additional executable API data 882a representing performing content moderation. For further example, a second association might represent that a request of proactively presenting content to a user is associated with an addition request of opening a microphone for capturing a follow-up user input. Therefore, in response to determining second executable API data 866b represents proactively presenting content to a user, then the action creation component 880 may generate second additional executable API data 882b representing opening of a microphone to capture a follow-up user input. In some embodiments, the associations may include a natural language description of the request, executable API calls corresponding to the request for the action and the associated additional request. In some embodiments, the association may further indicate an order in which the request and/or the additional request are to be performed. For example, with respect to the TTS/content moderation example, the association may further indicate that the content moderation is to be performed prior to performing the TTS processing.

In some embodiments, the associations may be stored in the action repository 875, in which case the action creation component 880 may query the action repository 875, using the executable API data $866a$-$n$, for the abovementioned associations (or an indication of the associations) to generate the additional executable API data $882a$-$n$. In the instance where the action creation component 880 determines that none of the executable API data $866a$-$n$ are associated with an additional request, the action creation component 880 may not generate additional executable API data $882a$-$n$.

In some embodiments, the action creation component 880 may generate the executable API data $866a$-$n$ to include the additional executable API data $882a$-$n$, rather than generating additional executable API data $882a$-$n$ separately. The executable API data $866a$-$n$ including one or more executable API calls based on the requests in the action plan data 542 and including one or more additional executable API calls, may also include an order in which both the foregoing may be executed (e.g., execute content moderation prior to TTS processing).

The action creation component 880 may send the executable API data $866a$-$n$ and the additional executable API data $882a$-$n$ to the action execution component 885. The action execution component 885 may cause execution of the one or more API calls corresponding to the executable API data $866a$-$n$ and the additional executable API data $882a$-$n$. For example, the action execution component 885 may process the executable API data $866a$-$n$ and/or the additional executable API data $882a$-$n$ to generate action data $747a$-$n$. Action data 747a may represent, for example, an instruction (e.g., an executable API call determined from the executable API data $866a$-$n$ and/or the additional executable API data $882a$-$n$) for a particular API to process to perform a function represented by the executable API call. In some embodiments, the action plan execution component 545 may generate the action data $747a$-$n$ to represent an instruction to provide the description of the action performable/to be performed with respect to the user input and/or the current task.

The action execution component 885 may send the action data $747a$-$n$ to the responding component $750a$-$n$, such as the API provider component, the LLM agent component, the skill component 954, the TTS component 956, and/or the orchestrator component 930. In some embodiments, the action execution component 885 may cause the responding component(s) $750a$-$n$ using a Representation State Transfer (REST) client and/or a Coral client. In some embodiments, the action plan execution component 545 may further include a hypertext transfer protocol (HTTP) client, which may be configured to cause a component remote to the system component(s) 120 (e.g., a LLM agent component that is remote to the system component(s) 120) to perform a function corresponding to the executable API call. In such embodiments, if action data 747a corresponds to a remote component, the action execution component 885 may send the action data 747a to the HTTP client to cause the remote component to perform the action corresponding to the action data 747a.

As discussed above, in some embodiments, the action execution component 885 may be configured to execute one or more of the executable API data $866a$-$n$ and/or the additional executable API data $882a$-$n$ concurrently/at least partially in parallel. For example, if first executable API data 866a corresponds to turning on a living room light and a second executable API data 866b corresponds to turning on a TV, and there is no determined order in which to execute the executable API data $866a$-$b$, the action execution component 885 may cause the actions to be performed concurrently/at least partially in parallel.

As further discussed above, in some embodiments, the action plan execution component 545 (e.g., the LLM action resolution component 865, the action validation component 870 and/or the action creation component 880) may be configured to determine an order in which one or more of the executable API data $866a$-$n$ and/or the additional executable API data $882a$-$n$ are to be executed. In such embodiments, the action execution component 885 may be further configured to cause execution of one or more of the executable API data $866a$-$n$ and/or the additional executable API data $882a$-$n$ in the determined order. For example, with respect to the example provided above regarding the request of "unlock the front door," where the action validation component 870 determines that the request may potentially be in conflict with a system operating policy and determines that a request for authorization should be output to the user prior to execution of the request, the action execution component 885 may cause the request for authorization to be executed prior to causing execution of the request to unlock the front door. For further example, if first executable API data 866a corresponds to changing a TV channel and first executable API data 866a corresponds to turning the TV on, the action execution component 885 may cause the TV to be turned on prior to causing the TV channel to be changed.

With reference once more to causing the responding component(s) $750a$-$n$ (e.g., the API provider component, the LLM agent component, the skill component 954, and/or the TTS component 956) to generate a potential response(s) to the user input, and as discussed herein above.

The responding component(s) 750*a-n* may send the action response data 558*a-n* representing one or more responses generated by the one or more APIs corresponding to the action data 747*a-n* (e.g., the descriptions of the actions performable by the APIs with respect to the user input and/or the current task) to the action execution component 885. For example, in response to an API call to the skill component 954 associated with a user input for turning on a light, the action response data 558*a* may correspond to "turn on the light," "turn_on_device ("light ", [device ID])", or the like. For further example, in response to an API call to the skill component 954 associated with a user input for ordering a pizza from a particular restaurant, the action response data 558*b* may correspond to "order medium pizza from [restaurant name]", "order_pizza ("medium", "pizza", "[restaurant name]")", or the like. The action execution component 885 may send the action response data 558*a-n* to the shortlister language model 740 for further processing.

In some embodiments, the action execution component 885 may be further configured to filter (e.g., remove, replace, truncate) the action response data 558*a-n* for information that is unnecessary for downstream processing by the system 100 (e.g., information similar to that included in the context data 869). The action execution component 885 may filter the action response data 558*a-n* using one or more instructions (e.g., in the form of JavaScript Object Notation (JSON)). In some embodiments, the one or more instructions may be associated with the component/API from which the response data 558*a-n* was received. The one or more instructions may include an action to be performed with respect to action response data 558*a-n* received from a particular component/API (e.g., replace, remove, truncate, etc.), an indication of one or more portions of the response data 558*a-n* that are to be replaced (e.g., one or more values, words, indicators, etc.), and, where applicable, data that is to replace the one or more portions. For example, a first instruction may specify that information specific to a user (e.g., user ID, location, etc.) should be removed from action response data from a particular component (e.g., a weather skill component), such that in response to receiving action response data 558*a* including "Tomorrow in [user location] will be mostly sunny with a slight chance of rain in the evening," the action execution component 885 may use the first instruction to generate action response data including "Tomorrow will be mostly sunny with a slight chance of rain in the evening," where the reference to [user location] is removed from the action response data 558*a*. Alternatively, the first instruction may specify that information corresponding to a user's location should be replaced with "your location," such that, for the above example, the action execution component 885 may use the first instruction to generate action response data including "Tomorrow in your location will be mostly sunny with a slight chance of rain in the evening." For further example, a second instruction may specify that action response data from a particular component (e.g., a component configured to determine and return indications of devices including a particular hardware capability (e.g., audio output, video output, etc.) should include no more than 5 entries (e.g., 5 corresponding endpoint devices), such that in response to receiving action response data 558*a* including more than 5 entries (e.g., more than 5 indications of endpoint devices including the particular hardware capability), the action execution component 885 may use the second instruction to remove any additional entries.

In some embodiments, the one or more instructions may be stored in the action repository 875 in association with a corresponding component/API (e.g., in the API description). The one or more instructions may be included in the API data 877 (e.g., in the API descriptions), which may be additionally received by the action execution component 885 from action creation component 880. In some embodiments, the one or more instructions may be generated using JSONPath and JSON Patch. Thereafter, the action response data 558*a-n* (generated by the one or more components/filtered by the action execution component 885) may be sent to the LLM shortlister component 540, which may process as described above and send the potential response data 543*a-n* to the task generation component 535 and/or the response arbitration component 560.

Figure 9:
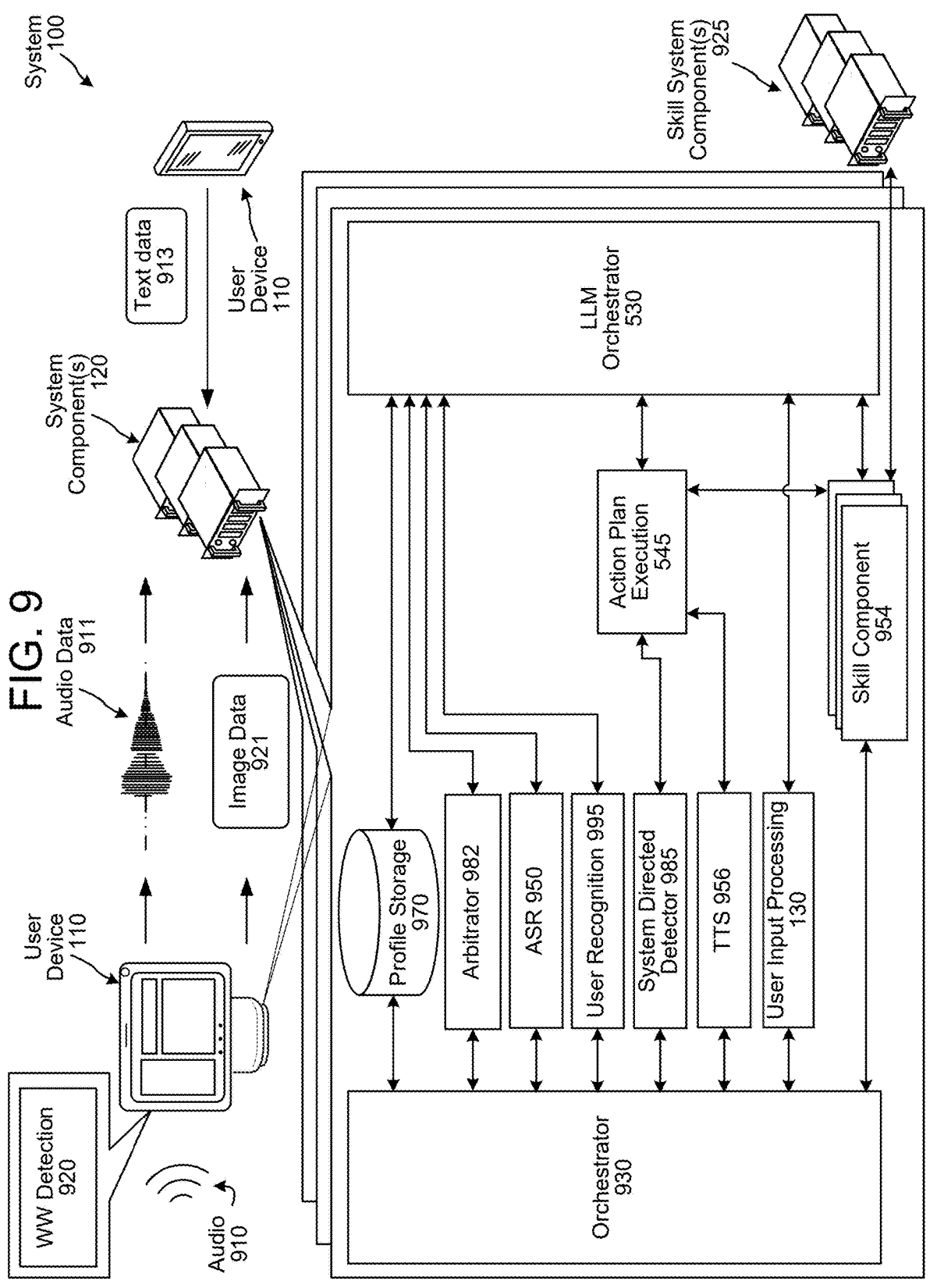
FIG. 9 is a conceptual diagram of components of the system, according to embodiments of the present disclosure.

The system 100 may operate using various components as described in FIG. 9. The various components may be located on same or different physical devices. Communication between various components may occur directly or across a network(s) 199. The user device 110 may include audio capture component(s), such as a microphone or array of microphones of a user device 110, captures audio 910 and creates corresponding audio data. Once speech is detected in audio data representing the audio 910, the user device 110 may determine if the speech is directed at the user device 110/system component(s). In at least some embodiments, such determination may be made using a wakeword detection component 920. The wakeword detection component 920 may be configured to detect various wakewords. In at least some examples, each wakeword may correspond to a name of a different digital assistant. An example wakeword/digital assistant name is "Alexa." In another example, input to the system may be in form of text data 913, for example as a result of a user typing an input into a user interface of user device 110. Other input forms may include indication that the user has pressed a physical or virtual button on user device 110, the user has made a gesture, etc. The user device 110 may also capture images using camera(s) of the user device 110 and may send image data 921 representing those image(s) to the system component(s). The image data 921 may include raw image data or image data processed by the user device 110 before sending to the system component(s). The image data 921 may be used in various manners by different components of the system to perform operations such as determining whether a user is directing an utterance to the system, interpreting a user command, responding to a user command, etc.

The wakeword detection component 920 of the user device 110 may process the audio data, representing the audio 910, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 910, is analyzed to determine if specific characteristics of the audio data match preconfigured acoustic waveforms, audio signatures, or other data corresponding to a wakeword.

Thus, the wakeword detection component 920 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 920 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 920 and/or input is detected by an input detector, the user device 110 may "wake" and begin transmitting audio data 911, representing the audio 910, to the system component(s) 120. The audio data 911 may include data corresponding to the wakeword; in other embodiments, the portion of the audio corresponding to the wakeword is removed by the user device 110 prior to sending the audio data 911 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 920 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 954 of one or more system component(s) 120.

The user device 110/system component(s) may also include a system directed input detector 985. The system directed input detector 985 may be configured to determine whether an input to the system (for example speech, a gesture, etc.) is directed to the system or not directed to the system (for example directed to another user, etc.). The system directed input detector 985 may work in conjunction with the wakeword detection component 920. If the system directed input detector 985 determines an input is directed to the system, the user device 110 may "wake" and begin sending captured data for further processing. If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 985 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 985 is determining whether an input is potentially device directed. For example, the system may output an orange indicator while considering an input, and may output a green indicator if a system directed input is detected. Other such configurations are possible.

Upon receipt by the system component(s) 120, the audio data 911 may be sent to an orchestrator component 930 and/or the LLM orchestrator component 530. The orchestrator component 930 may include memory and logic that enables the orchestrator component 930 to transmit various pieces and forms of data to various components of the system, as well as perform other operations as described herein. In some embodiments, the orchestrator component 930 may optionally be included in the system component(s) 120. In embodiments where the orchestrator component 930 is not included in the system component(s) 120, the audio data 911 may be sent directly to the LLM orchestrator component 530. Further, in such embodiments, each of the components of the system component(s) 120 may be configured to interact with the LLM orchestrator component 530, the action plan execution component 545, and/or the API provider component.

In some embodiments, the system component(s) 120 may include an arbitrator component 982, which may be configured to determine whether the orchestrator component 930 and/or the LLM orchestrator component 530 are to process with respect to the audio data 911. In some embodiments, the LLM orchestrator component 530 may be selected to process with respect to the audio data 911 only if the user 105 associated with the audio data 911 (or the user device 110 that captured the audio 910) has previously indicated that the LLM orchestrator component 530 may be selected to process with respect to user inputs received from the user 105.

In some embodiments, the arbitrator component 982 may determine the orchestrator component 930 and/or the LLM orchestrator component 530 are to process with respect to the audio data 911 based on metadata associated with the audio data 911. For example, the arbitrator component 982 may be a classifier configured to process a natural language representation of the audio data 911 (e.g., output by the ASR component 950) and classify the corresponding user input as to be processed by the orchestrator component 930 and/or the LLM orchestrator component 530. For further example, the arbitrator component 982 may determine whether the device from which the audio data 911 is received is associated with an indicator representing the audio data 911 is to be processed by the orchestrator component 930 and/or the LLM orchestrator component 530. As an even further example, the arbitrator component 982 may determine whether the user (e.g., determined using data output from the user recognition component 995) from which the audio data 911 is received is associated with a user profile including an indicator representing the audio data 911 is to be processed by the orchestrator component 930 and/or the LLM orchestrator component 530. As another example, the arbitrator component 982 may determine whether the audio data 911 (or the output of the ASR component 950) corresponds to a request representing that the audio data 911 is to be processed by the orchestrator component 930 and/or the LLM orchestrator component 530 (e.g., a request including "let's chat" may represent that the audio data 911 is to be processed by the LLM orchestrator component 530).

In some embodiments, if the arbitrator component 982 is unsure (e.g., a confidence score corresponding to whether the orchestrator component 930 and/or the LLM orchestrator component 530 is to process is below a threshold), then the arbitrator component 982 may send the audio data 911 to both of the orchestrator component 930 and the LLM orchestrator component 530. In such embodiments, the orchestrator component 930 and/or the LLM orchestrator component 530 may include further logic for determining further confidence scores during processing representing whether the orchestrator component 930 and/or the LLM orchestrator component 530 should continue processing, as is discussed further herein below.

The arbitrator component 982 may send the audio data 911 to an ASR component 950. In some embodiments, the component selected to process the audio data 911 (e.g., the orchestrator component 930 and/or the LLM orchestrator component 530) may send the audio data 911 to the ASR component 950. The ASR component 950 may transcribe the audio data 911 into text data. The text data output by the ASR component 950 represents one or more than one (e.g., in the form of an N-best list) ASR hypotheses representing speech represented in the audio data 911. The ASR component 950 interprets the speech in the audio data 911 based on a similarity between the audio data 911 and pre-established language models. For example, the ASR component 950 may compare the audio data 911 with models for sounds (e.g., acoustic units such as phonemes, senons, phones, etc.) and sequences of sounds to identify words that match the sequence of sounds of the speech represented in the audio data 911. The ASR component 950 sends the text data generated thereby to the arbitrator component 982, the orchestrator component 930, and/or the LLM orchestrator component 530. In instances where the text data is sent to the arbitrator component 982, the arbitrator component 982 may send the text data to the component selected to process the audio data 911 (e.g., the orchestrator component 930 and/or the LLM orchestrator component 530). The text data sent from the ASR component 950 to the arbitrator component 982, the orchestrator component 930, and/or the LLM orchestrator component 530 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 930 may cause a NLU component (not shown) to perform processing with respect to the ASR data generated by the ASR component 950. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 110, the system component(s) 120, a skill component 954, a skill system component(s) 925, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 110. In another example, if the ASR data corresponds to "turn off the lights," the NLU component may determine an intent that the system turn off lights associated with the device 110 or the user 105. However, if the NLU component is unable to resolve the entity—for example, because the entity is referred to by anaphora such as "this song" or "my next appointment"—the system can send a decode request to another speech processing system for information regarding the entity mention and/or other context related to the utterance. The speech processing system may augment, correct, or base results data upon the ASR data as well as any data received from the system.

The NLU component may return NLU results data (which may include tagged text data, indicators of intent, etc.) back to the orchestrator component 930. The orchestrator component 930 may forward the NLU results data to a skill component(s) 954. If the NLU results data includes a single NLU hypothesis, the NLU component and the orchestrator component 930 may direct the NLU results data to the skill component(s) 954 associated with the NLU hypothesis. If the NLU results data includes an N-best list of NLU hypotheses, the NLU component and the orchestrator component 930 may direct the top scoring NLU hypothesis to a skill component(s) 954 associated with the top scoring NLU hypothesis. The system may also include a post-NLU ranker which may incorporate other information to rank potential interpretations determined by the NLU component.

In some embodiments, after determining that the orchestrator component 930 and/or the LLM orchestrator component 530 should process with respect to the user input data 127, the arbitrator 982 may be configured to periodically determine whether the orchestrator component 930 and/or the LLM orchestrator component 530 should continue processing with respect to the user input data 127. For example, after a particular point in the processing of the orchestrator component 930 (e.g., after performing NLU, prior to determining a skill component 954 to process with respect to the user input data 127, prior to performing an action responsive to the user input, etc.) and/or the LLM orchestrator component 530 (e.g., after selecting a task to be completed, after receiving the action response data from the one or more components, after completing a task, prior to performing an action responsive to the user input, etc.) the orchestrator component 930 and/or the LLM orchestrator component 530 may query the arbitrator component 982 has determined that the orchestrator component 930 and/or the LLM orchestrator component 530 should halt processing with respect to the user input data 127. As discussed above, the system 100 may be configured to stream portions of data associated with processing with respect to a user input to the one or more components such that the one or more components may begin performing their configured processing with respect to that data as soon as it is available to the one or more components. As such, the arbitrator component 982 may cause the orchestrator component 930 and/or the LLM orchestrator component 530 to begin processing with respect to a user input as soon as a portion of data associated with the user input data 127 is available (e.g., the ASR data, context data, output of the user recognition component 995. Thereafter, once the arbitrator component 982 has enough data to perform the processing described herein above to determine whether the orchestrator component 930 and/or the LLM orchestrator component 530 is to process with respect to the user input, the arbitrator component 982 may inform the corresponding component (e.g., the orchestrator component 930 and/or the LLM orchestrator component 530) to continue/halt processing with respect to the user input at one of the logical checkpoints in the processing of the orchestrator component 930 and/or the LLM orchestrator component 530.

As discussed herein above, in some embodiments, the LLM shortlister component 540 (e.g., via the shortlister language model 740) may be configured to select the orchestrator component 930 to process with respect to the user input and/or a current task to return action response data (e.g., the action response data 558*a*) representing a response to the user input/current task or a description of an action the orchestrator component 930 may cause to be performed in response to the user input/current task. As such, in some embodiments, although the LLM orchestrator component 530 is determined to process with respect to a user input, the LLM orchestrator component 530 may determine, during such processing, that the orchestrator component 930 should process with respect to the user input.

A skill system component(s) 925 may communicate with a skill component(s) 954 within the system component(s) 120 directly with the orchestrator component 930 and/or the action plan execution component 545, or with other components. A skill system component(s) 925 may be configured to perform one or more actions. An ability to perform such action(s) may sometimes be referred to as a "skill." That is, a skill may enable a skill system component(s) 925 to execute specific functionality in order to provide data or perform some other action requested by a user. For example, a weather service skill may enable a skill system component(s) 925 to provide weather information to the system component(s) 120, a car service skill may enable a skill system component(s) 925 to book a trip with respect to a taxi or ride sharing service, an order pizza skill may enable a skill system component(s) 925 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 954 dedicated to interacting with the skill system component(s) 925. Unless expressly stated otherwise, reference to a skill, skill device, or skill component may include a skill component 954 operated by the system component(s) 120 and/or skill operated by the skill system component(s) 925. Moreover, the functionality described herein as a skill or skill may be referred to using many different terms, such as an action, bot, app, or the like. The skill component 954 and or skill system component(s) 925 may return output data to the orchestrator component 930.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 956. The TTS component 956 may generate audio data (e.g., synthesized speech) from text data using one or more different methods. Text data input to the TTS component 956 may come from a skill component 954, the orchestrator component 930, or another component of the system. In one method of synthesis called unit selection, the TTS component 956 matches text data against a database of recorded speech. The TTS component 956 selects matching units of recorded speech and concatenates the units together to form audio data. In another method of synthesis called parametric synthesis, the TTS component 956 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 911 representing the commands to the system component(s) 120 for processing, after which the system component(s) 120 may return output data that can cause the user device 110 to engage its camera.

The system component(s) 120/the user device 110 may include a user recognition component 995 that recognizes one or more users using a variety of data. However, the disclosure is not limited thereto, and the user device 110 may include the user recognition component 995 instead of and/or in addition to the system component(s) 120 without departing from the disclosure.

The user recognition component 995 may take as input the audio data 911 and/or text data output by the ASR component 950. The user recognition component 995 may perform user recognition by comparing audio characteristics in the audio data 911 to stored audio characteristics of users. The user recognition component 995 may also perform user recognition by comparing biometric data (e.g., fingerprint data, iris data, etc.), received by the system in correlation with the present user input, to stored biometric data of users assuming user permission and previous authorization. The user recognition component 995 may further perform user recognition by comparing image data (e.g., including a representation of at least a feature of a user), received by the system in correlation with the present user input, with stored image data including representations of features of different users. The user recognition component 995 may perform additional user recognition processes, including those known in the art.

The user recognition component 995 determines scores indicating whether user input originated from a particular user. For example, a first score may indicate a likelihood that the user input originated from a first user, a second score may indicate a likelihood that the user input originated from a second user, etc. The user recognition component 995 also determines an overall confidence regarding the accuracy of user recognition operations.

Output of the user recognition component 995 may include a single user identifier corresponding to the most likely user that originated the user input. Alternatively, output of the user recognition component 995 may include an N-best list of user identifiers with respective scores indicating likelihoods of respective users originating the user input. The output of the user recognition component 995 may be used to inform processing of the arbitrator component 982, the orchestrator component 930, and/or the LLM orchestrator component 530 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 970 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

In some embodiments, the system component(s) 120 may include the user input processing component 130. In some embodiments, the techniques described in relation to the user input processing component 130 may be performed by the LLM shortlister 540 included in the LLM orchestrator 530 as described in relation to FIG. 7.

Although the components of FIG. 9 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure.

In at least some embodiments, the system component(s) may receive the audio data 911 from the user device 110, to recognize speech corresponding to a spoken input in the received audio data 911, and to perform functions in response to the recognized speech. In at least some embodiments, these functions involve sending directives (e.g., commands), from the system component(s) to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may instruct the user device 110 to output an audible response (e.g., using TTS processing performed by an on-device TTS component) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

In at least some embodiments, a hybrid selector, of the user device 110, may send the audio data 911 to the wakeword detection component 920. If the wakeword detection component 920 detects a wakeword in the audio data 911, the wakeword detection component 920 may send an indication of such detection to the hybrid selector. In response to receiving the indication, the hybrid selector may send the audio data 911 to the system component(s) and/or the ASR component of the user device 110. The wakeword detection component 920 may also send an indication, to the hybrid selector, representing a wakeword was not detected. In response to receiving such an indication, the hybrid selector may refrain from sending the audio data 911 to the system component(s), and may prevent the ASR component of the user device 110 from further processing the audio data 911. In this situation, the audio data 911 can be discarded.

The user device 110 may conduct its own speech processing using on-device language processing components, such as an ASR component, similar to the manner discussed herein with respect to the ASR component 950 of the system component(s). The user device 110 may also internally include, or otherwise have access to, other components such as one or more skill components capable of executing commands based on the output of an orchestrator component, an LLM orchestrator, or other results determined by the user device 110/system component(s) (which may operate similarly to skill components 954), an arbitrator component (configured to process in a similar manner to that discussed herein above with respect to the arbitrator component 982), an action plan execution component (configured to process in a similar manner to that discussed herein with respect to the action plan execution component 545), a personalized context component (configured to process in a similar manner to that discussed herein with respect to the personalized context component 565), a user recognition component (configured to process in a similar manner to that discussed herein with respect to the user recognition component 995 of the system component(s)), profile storage (configured to store similar profile data to that discussed herein with respect to the profile storage 970 of the system component(s)), or other components. In at least some embodiments, the profile storage may only store profile data for a user or group of users specifically associated with the user device 110. Similar to as described above with respect to skill component 954, a skill component of the user device 110 may communicate with a skill system component(s) 925. The user device 110 may also have its own TTS component, which may operate similarly to TTS component 956.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector, of the user device 110, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 911 to pass to the system component(s) while also receiving (e.g., intercepting) this audio data 911 and sending the audio data 911 to the HEC.

In at least some embodiments, the hybrid selector may further include a local request orchestrator (LRO) configured to notify the ASR component of the user device 110 about the availability of new audio data 911 that represents user speech, and to otherwise initiate the operations of local language processing when new audio data 911 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 911 is received, the HP may allow the audio data 911 to pass through to the system component(s) and the HP may also input the audio data 911 to the on-device ASR component by routing the audio data 911 through the HEC of the hybrid selector, whereby the LRO notifies the on-device ASR component of the audio data 911. At this point, the hybrid selector may wait for response data from either or both of the system component(s) or the local language processing components. However, the disclosure is not limited thereto, and in some examples the hybrid selector may send the audio data 911 only to the local ASR component without departing from the disclosure. For example, the user device 110 may process the audio data 911 locally without sending the audio data 911 to the system component(s).

The local ASR component is configured to receive the audio data 911 to recognize speech in the audio data 911. The user device 110 and/or the system component(s) may associate a unique identifier with each natural language user input. The user device 110 may include the unique identifier when sending the audio data 911 to the system component(s), and the response data from the system component(s) may include the unique identifier to identify which natural language user input the response data corresponds.

In at least some embodiments, the user device 110 may include, or be configured to use, one or more skill components that may work similarly to the skill component(s) 954 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 925. For example, a skill system component(s) 925 may be located in a remote environment (e.g., separate location) such that the user device 110 may only communicate with the skill system component(s) 925 via the network(s) 199. However, the disclosure is not limited thereto. For example, in at least some embodiments, a skill system component(s) 925 may be configured in a local environment (e.g., home server and/or the like) such that the user device 110 may communicate with the skill system component(s) 925 via a private network, such as a local area network (LAN).

A skill system component(s) 925 may communicate with a skill component(s) 954 within the system component(s) 120 directly with the orchestrator component 930 and/or the action plan execution component 545, or with other components. A skill system component(s) 925 may be configured to perform one or more actions. An ability to perform such action(s) may sometimes be referred to as a "skill." That is, a skill may enable a skill system component(s) 925 to execute specific functionality in order to provide data or perform some other action requested by a user. For example, a weather service skill may enable a skill system component(s) 925 to provide weather information to the system component(s) 120, a car service skill may enable a skill system component(s) 925 to book a trip with respect to a taxi or ride sharing service, an order pizza skill may enable a skill system component(s) 925 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 954 dedicated to interacting with the skill system component(s) 925. Unless expressly stated otherwise, reference to a skill, skill device, or skill component may include a skill component 954 operated by the system component(s) 120 and/or skill operated by the skill system component(s) 925. Moreover, the functionality described herein as a skill or skill may be referred to using many different terms, such as an action, bot, app, or the like. The skill component 954 and or skill system component(s) 925 may return output data to the orchestrator component 930.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented"

dialog systems typically need to recognize, retain, and use information collected during more than one input during a back-and-forth or "multi-turn" interaction with the user.

The system component(s) includes a TTS component 956. The TTS component 956 may generate audio data (e.g., synthesized speech) from text data using one or more different methods. Text data input to the TTS component 956 may come from a skill component 954, the orchestrator component 930, or another component of the system. In one method of synthesis called unit selection, the TTS component 956 matches text data against a database of recorded speech. The TTS component 956 selects matching units of recorded speech and concatenates the units together to form audio data. In another method of synthesis called parametric synthesis, the TTS component 956 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 911 representing the commands to the system component(s) 120 for processing, after which the system component(s) 120 may return output data that can cause the user device 110 to engage its camera.

The system component(s) 120 may include a user recognition component 995 that recognizes one or more users using a variety of data. The user recognition component 995 may take as input the audio data 911 and/or text data output by the ASR component 950. The user recognition component 995 may perform user recognition by comparing audio characteristics in the audio data 911 to stored audio characteristics of users. The user recognition component 995 may also perform user recognition by comparing biometric data (e.g., fingerprint data, iris data, etc.), received by the system in correlation with the present user input, to stored biometric data of users assuming user permission and previous authorization. The user recognition component 995 may further perform user recognition by comparing image data (e.g., including a representation of at least a feature of a user), received by the system in correlation with the present user input, with stored image data including representations of features of different users. The user recognition component 995 may perform additional user recognition processes, including those known in the art.

The user recognition component 995 determines scores indicating whether user input originated from a particular user. For example, a first score may indicate a likelihood that the user input originated from a first user, a second score may indicate a likelihood that the user input originated from a second user, etc. The user recognition component 995 also determines an overall confidence regarding the accuracy of user recognition operations.

Output of the user recognition component 995 may include a single user identifier corresponding to the most likely user that originated the user input. Alternatively, output of the user recognition component 995 may include an N-best list of user identifiers with respective scores indicating likelihoods of respective users originating the user input. The output of the user recognition component 995 may be used to inform processing of the arbitrator component 982, the orchestrator component 930, and/or the LLM orchestrator component 530 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 970 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 9 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure.

In at least some embodiments, the system component(s) may receive the audio data 911 from the user device 110, to recognize speech corresponding to a spoken input in the received audio data 911, and to perform functions in response to the recognized speech. In at least some embodiments, these functions involve sending directives (e.g., commands), from the system component(s) to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may instruct the user device 110 to output an audible response (e.g., using TTS processing performed by an on-device TTS component) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

Figure 10:
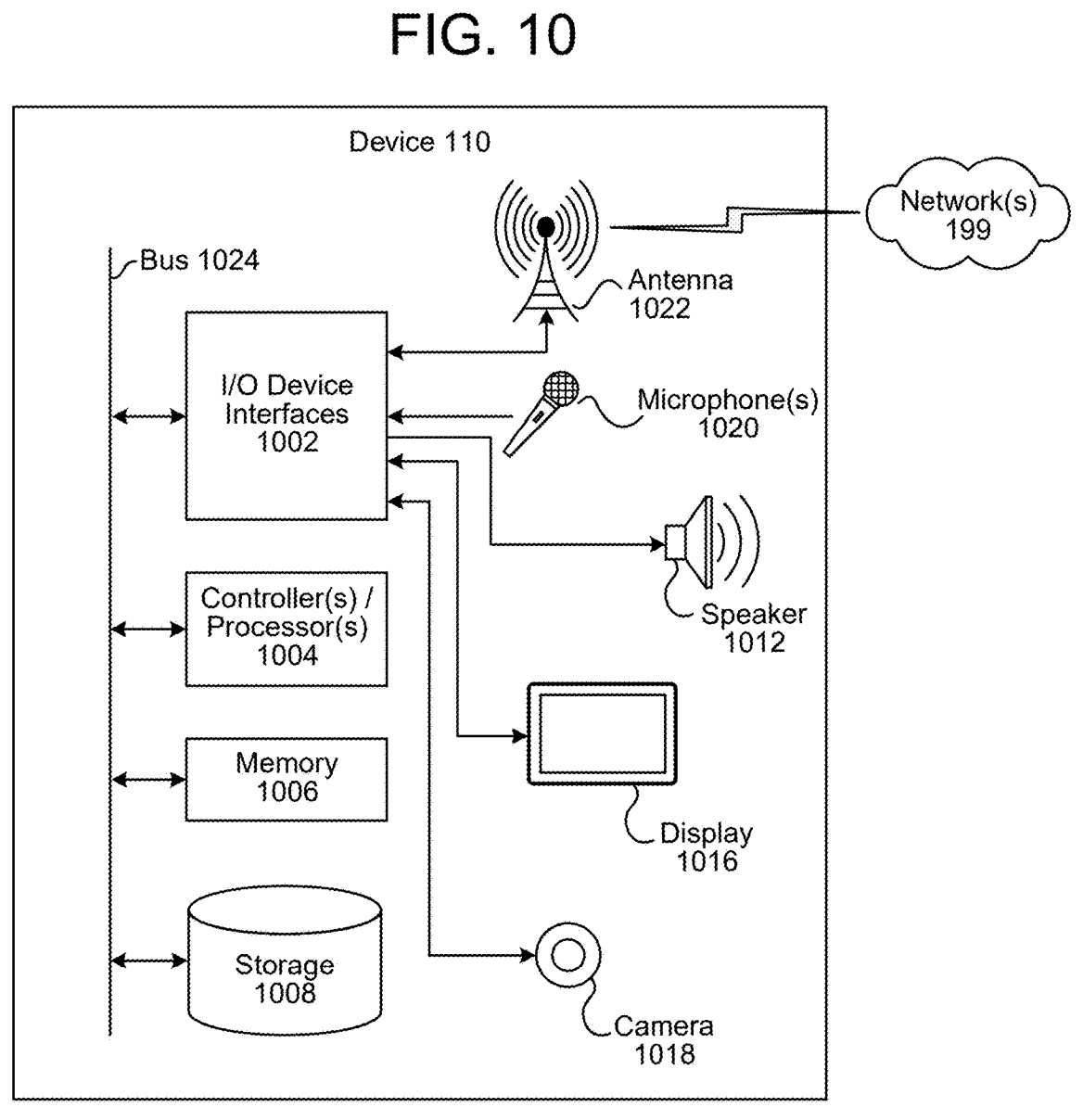

FIG. 10 is a block diagram conceptually illustrating a device 110 that may be used with the system. FIG. 11 is a block diagram conceptually illustrating example components of a remote device, such as the natural language command processing system component(s) 120, which may assist with ASR processing, NLU processing, etc., and a skill system 925. A system (120/925) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) 120 may be located remotely from the device 110 as its operations may not require proximity to the user. The server/system component(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The supporting device 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/925) may be included in the overall system 100 of the present disclosure, such as one or more natural language processing system components 120 for performing ASR processing, one or more natural language processing system components 120 for performing NLU processing, one or more skill systems 925, etc. In operation, each of these systems may include computer-readable and computer-executable instructions that reside on the respective device (120/925), as will be discussed further below.

Each of these devices (110/120/925) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/925) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/925) may also be connected to removable or external non-volatile memory and/or storage (such as a removable memory card, memory key drive, networked storage, etc.) through respective input/output device interfaces (1002/1102).

Computer instructions for operating each device (110/120/925) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/925) includes input/output device interfaces (1002/1102). A variety of components may be connected through the input/output device interfaces (1002/1102), as will be discussed further below. Additionally, each device (110/120/925) may include an address/data bus (1024/1124) for conveying data among components of the respective device. Each component within a device (110/120/925) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language command processing system component(s) 120, or a skill system 925 may include their own dedicated processors, memory, and/or storage. Alternatively, one or more of the components of the device(s) 110, the natural language command processing system component(s) 120, or a skill system 925 may utilize the I/O interfaces (1002/1102), processor(s) (1004/1104), memory (1006/1106), and/or storage (1008/1108) of the device(s) 110, natural language command processing system component(s) 120, or the skill system 925, respectively. Thus, the ASR component 950 may have its own I/O interface(s), processor(s), memory, and/or storage; the NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s) 120, and a skill system 925, as described herein, are illustrative, and may be located as a stand-alone device or may be included, in whole or in part, as a component of a larger device or system. As can be appreciated, a number of components may exist either on a system component(s) 120 and/or on device 110. Unless expressly noted otherwise, the system version of such components may operate similarly to the device version of such components and thus the description of one version (e.g., the system version or the local version) applies to the description of the other version (e.g., the local version or system version) and vice-versa.

Figure 12:
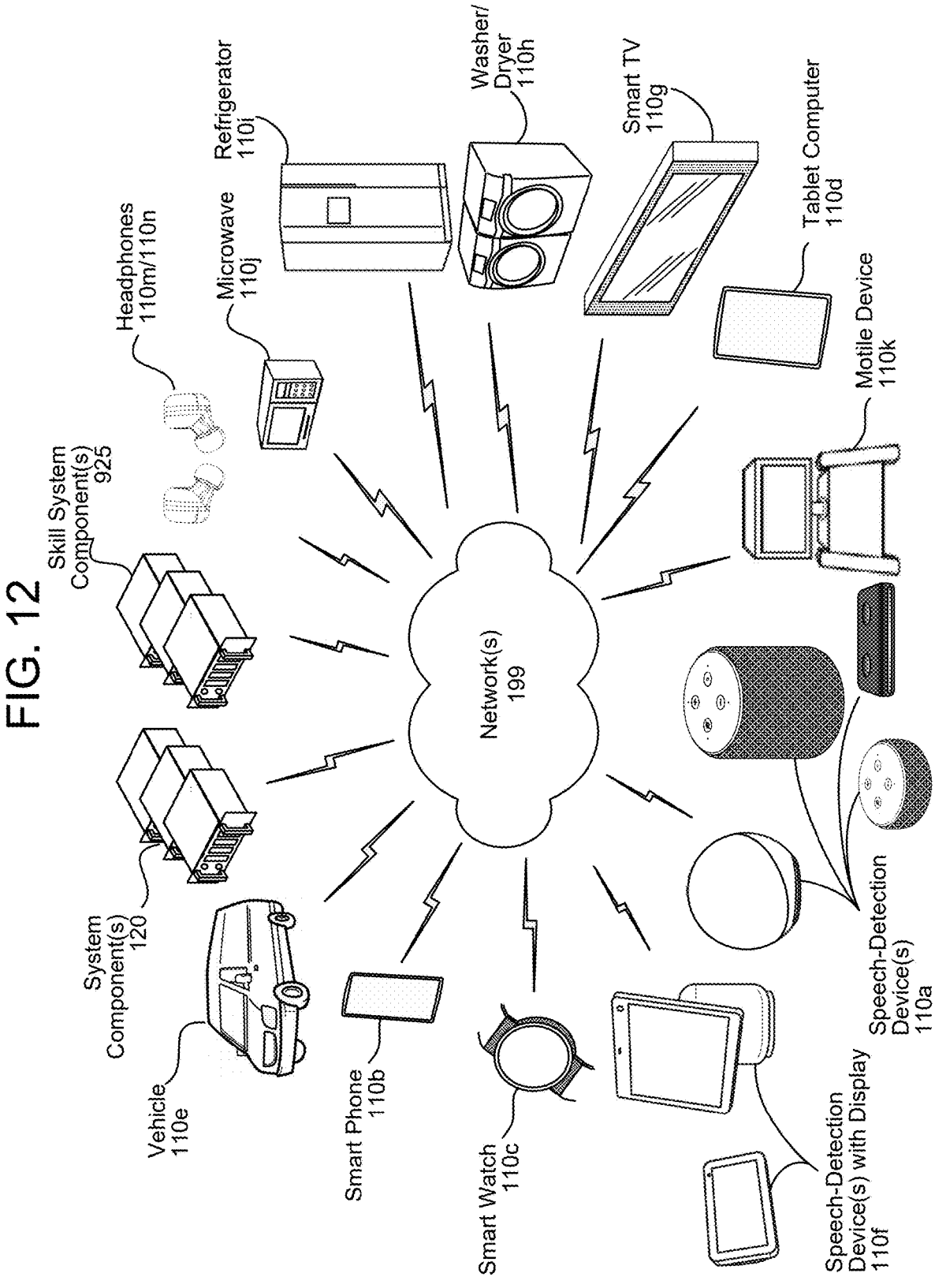
FIG. 12 illustrates an example of a computer network for use with the overall system, according to embodiments of the present disclosure.

As illustrated in FIG. 12, multiple devices (110a-110n, 120, 925) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system(s) 925, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 950, the NLU component, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving a user input representing a natural language request for performance of an action;
   determining a prompt based on the user input, the prompt including a request for a language model (LM) to generate a response to the user input;
   receiving first data representing a finite state machine (FSM) corresponding to a first plurality of Application Programming Interface (API) names and a second plurality of arguments available for the LM to select from;
   determining, from the first data, second data representing the first plurality of API names;
   processing the prompt using the LM to generate first tokens from the second data, the first tokens representing a first API name from the first plurality of API names, wherein the processing by the language model to generate the first tokens is constrained using the first data;
   based on the first API name, determining, from the first data, third data representing a set of arguments from the second plurality of arguments, the set of arguments being associated with the first API name;
   generating, by the LM, second tokens from the third data, the second tokens representing a first argument from the set of arguments;
   causing performance of the action using at least the first API name and the first argument;
   determining, using at least the action, first output data responsive to the user input; and
   causing presentation of the first output data using a device.

2. The computer-implemented method of claim 1, wherein the FSM corresponds to a third plurality of argument values, and the method further comprises:
   based on the first argument, determining, from the first data, fourth data representing a set of argument values from the third plurality of argument values, the set of argument values associated with the first argument;
   generating, by the LM, third tokens from the fourth data, the third tokens representing a first argument value from the set of argument values;

generating, by the LM, fourth tokens, from the third data, representing a second argument from the set of arguments;

determining that a second argument value, for the second argument, corresponds to free-text generation; and based on determining that the second argument corresponds to free-text generation, generating, by the LM, fifth tokens representing the second argument value, wherein the fifth tokens are generated without using the first data, wherein causing performance of the action further comprises using the first API name, the first argument, the first argument value, the second argument, and the second argument value.

3. The computer-implemented method of claim 1, further comprising:

generating, by the LM, a first indicator representing that an API name is to be generated;

in response to the LM generating the first indicator, causing the LM to use the second data to generate the first tokens;

after generation of the second tokens, generating, by the LM, a second indicator representing that a system response to the user input is to be generated;

in response to the LM generating the second indicator, causing the LM to generate, without using the first data, third tokens representing the response;

determining second output data corresponding to the system response; and causing presentation of the second output data in response to the user input.

4. The computer-implemented method of claim 1, wherein the second data includes a third plurality of tokens representing the first plurality of API names from the first data, and the method further comprises:

determining at least a third token, different than the third plurality of tokens, that the LM is able to generate;

associating a score with the third token, wherein the score fails to satisfy a threshold condition; and generating by the LM the first tokens from the third plurality of tokens, wherein the LM does not generate the third token based on the score failing to satisfy the threshold condition.

5. A computer-implemented method comprising:

determining a prompt to input to a language model to generate a response to a natural language request;

determining first data based on a finite state machine (FSM) corresponding to a first plurality of actions available for the language model to select from;

processing the prompt using the language model to generate second data representing a first action from the first plurality of actions, wherein the processing by the language model to generate the second data is constrained using the first data;

determining, using at least the first action, output data responsive to the natural language request; and causing presentation of the output data using a device.

6. The computer-implemented method of claim 5, wherein the FSM corresponds to a second plurality of arguments, and the method further comprises:

based on generation of the second data, determining, based on the FSM, third data representing a set of arguments from the second plurality of arguments, the set of arguments being associated with the first action; and after generating the second data, generating, by the language model, fourth data from the third data, the fourth data representing a first argument from the set of arguments, the first argument to be used to determine a response to the natural language request.

7. The computer-implemented method of claim 5, wherein processing the prompt by the language model causes generation of an indication that an action is to be generated, and in response to generation of the indication, generating, by the language model, the second data from the first data.

8. The computer-implemented method of claim 5, further comprising:

generating a first data structure including the first data representing the first plurality of actions;

generating, by the language model, a first token representing a first portion of the second data;

generating a second data structure based on updating the first data structure to represent a set of actions from the first plurality of actions, wherein the set of actions correspond to the first token; and generating, by the language model, a second token representing a second portion of the second data, wherein the second token corresponds to the first action from the set of actions.

9. The computer-implemented method of claim 8, wherein the first token represents information corresponding to a first application programming interface.

10. The computer-implemented method of claim 5, further comprising:

after generating the second data, generating, by the language model, an indication that a system response to the natural language request is to be generated;

in response to generating the indication, ceasing use of the first data to cause generation by the language model; and generating, by the language model, third data representing the system response, wherein determining the output data is further based on the third data.

11. The computer-implemented method of claim 5, wherein the FSM corresponds to a second plurality of arguments and a third plurality of argument values, and the method further comprises:

determining third data based on the FSM, the third data representing a set of arguments from the second plurality of arguments associated with the first action;

generating, by the language model, fourth data from the third data, the fourth data representing a first argument from the set of arguments, the first argument to be used to perform the first action;

determining fifth data based on the FSM, the fifth data representing a set of argument values from the third plurality of argument values associated with the first argument; and generating, by the language model, sixth data from the fifth data, the sixth data representing a first argument value from the set of argument values, wherein the first argument value corresponds to the first argument.

12. The computer-implemented method of claim 5, wherein the FSM corresponds to a second plurality of arguments, and the method further comprises:

determining third data based on the FSM, the third data representing a set of arguments from the second plurality of arguments associated with the first action;

generating, by the language model, fourth data from the third data, the fourth data representing a first argument from the set of arguments, the first argument to be used to perform the first action;

determining, based on the FSM, that an argument value for the first argument corresponds to free-form generation; and in response to the argument value corresponding to free-form generation, generating, by the language model, fifth data representing the argument value.

13. The computer-implemented method of claim 12, further comprising:

generating, by the language model, an indication that generation of the argument value is complete; and in response to generation of the argument value being complete, causing the language model to perform further generation based on the FSM.

14. The computer-implemented method of claim 5, wherein the first plurality of actions correspond to a plurality of application programming interface commands.

15. A system comprising:

at least one processor; and at least one memory including instructions that, when executed by the at least one processor, cause the system to:

determine a prompt to input to a language model to generate a response to a natural language request;

determine first data based on a finite state machine (FSM) corresponding to a first plurality of actions available for the language model to select from;

process the prompt using the language model to generate second data representing a first action from the first plurality of actions, wherein the processing by the language model to generate the second data is constrained using the first data;

determine, using at least the first action, output data responsive to the natural language request; and cause presentation of the output data using a device.

16. The system of claim 15, wherein the FSM corresponds to a second plurality of arguments, wherein the at least one memory includes further instructions that, when executed by the at least one processor, further cause the system to:

based on generation of the second data, determine, based on the FSM, third data representing a set of arguments from the second plurality of arguments, the set of arguments being associated with the first action; and after generating the second data, generate, by the language model, fourth data from the third data, the fourth data representing a first argument from the set of arguments, the first argument to be used to determine a response to the natural language request.

17. The system of claim 15, wherein the instructions that cause the system to process the prompt by the language model further cause the system to:

generate an indication that an action is to be generated, and in response to generation of the indication, generate, by the language model, the second data from the first data.

18. The system of claim 15, wherein the at least one memory includes further instructions that, when executed by the at least one processor, further cause the system to:

generate a first data structure including the first data representing the first plurality of actions;

generate, by the language model, a first token representing a first portion of the second data;

generate a second data structure based on updating the first data structure to represent a set of actions from the first plurality of actions, wherein the set of actions correspond to the first token; and generate, by the language model, a second token representing a second portion of the second data, wherein the second token corresponds to the first action from the set of actions.

19. The system of claim 18, wherein the first token represents information corresponding to a first application programming interface.

20. The system of claim 15, wherein the at least one memory includes further instructions that, when executed by the at least one processor, further cause the system to:

after generating the second data, generate, by the language model, an indication that a system response to the natural language request is to be generated;

in response to generating the indication, cease use of the first data to cause generation by the language model; and generate, by the language model, third data representing the system response, wherein the instructions cause the system to determine the output data based on the third data.

21. The system of claim 15, wherein the FSM corresponds to a second plurality of arguments and a third plurality of argument values, and wherein the at least one memory includes further instructions that, when executed by the at least one processor, further cause the system to:

determine third data based on the FSM, the third data representing a set of arguments from the second plurality of arguments associated with the first action;

generate, by the language model, fourth data from the third data, the fourth data representing a first argument from the set of arguments, the first argument to be used to perform the first action;

determine fifth data based on the FSM, the fifth data representing a set of argument values from the third plurality of argument values associated with the first argument; and generate, by the language model, sixth data from the fifth data, the sixth data representing a first argument value from the set of argument values, wherein the first argument value corresponds to the first argument.

22. The system of claim 15, wherein the FSM corresponds to a second plurality of arguments, and wherein the at least one memory includes further instructions that, when executed by the at least one processor, further cause the system to:

determine third data based on the FSM, the third data representing a set of arguments from the second plurality of arguments associated with the first action;

generate, by the language model, fourth data from the third data, the fourth data representing a first argument from the set of arguments, the first argument to be used to perform the first action;

determine, based on the FSM, that an argument value for the first argument corresponds to free-form generation; and in response to the argument value corresponding to free-form generation, generate, by the language model, fifth data representing the argument value.

23. The system of claim 22, wherein the at least one memory includes further instructions that, when executed by the at least one processor, further cause the system to:

generate, by the language model, an indication that generation of the argument value is complete; and in response to generation of the argument value being complete, cause the language model to perform further generation based on the FSM.

24. The system of claim 15, wherein the first plurality of actions correspond to a plurality of application programming interface commands.

\* \* \* \* \*